(12) United States Patent
Boivin et al.

(10) Patent No.: US 10,384,728 B2
(45) Date of Patent: Aug. 20, 2019

(54) BEAM CONNECTOR AND METHOD OF INSTALLATION THEREOF

(71) Applicant: TRANSTEX COMPOSITE INC., Montreal (CA)

(72) Inventors: Mathieu Boivin, Montreal (CA); Walid Deir, Lachine (CA); Georges Bassily, Laval (CA); Swaroop Mulenahalli Kantharaju, Toronto (CA); Elizabeth Tome, St-Leonard (CA); Sylvain Daoust, Vaudreuil-Dorion (CA)

(73) Assignee: Transtex LLC, Montreal, Quebec (CA)

( * ) Notice: Subject to any disclaimer, the term of this patent is extended or adjusted under 35 U.S.C. 154(b) by 59 days.

(21) Appl. No.: 15/471,696

(22) Filed: Mar. 28, 2017

(65) Prior Publication Data
US 2017/0274942 A1 Sep. 28, 2017

Related U.S. Application Data

(60) Provisional application No. 62/314,062, filed on Mar. 28, 2016.

(51) Int. Cl.
*B62D 35/00* (2006.01)

(52) U.S. Cl.
CPC ............... *B62D 35/001* (2013.01)

(58) Field of Classification Search
CPC ............... B62D 35/001; F16B 2/12
USPC ..... 248/228.1, 228.3, 228.5, 229.22, 229.24, 248/231.41, 231.61
See application file for complete search history.

(56) References Cited

U.S. PATENT DOCUMENTS

| 434,957 | A |  | 8/1890 | Sheffield |
|---|---|---|---|---|
| 564,027 | A |  | 7/1896 | Pratt |
| 1,127,241 | A |  | 2/1915 | Hawksworth |
| 1,245,047 | A | * | 10/1917 | Sherman ............ F16L 3/24 248/72 |
| 1,511,085 | A |  | 10/1924 | McIntyre |
| 1,528,108 | A |  | 3/1925 | Hanson |
| 1,846,269 | A |  | 2/1932 | Musselman |
| 2,318,863 | A |  | 5/1943 | Jabelmann |
| 2,546,268 | A |  | 3/1951 | Legris |
| 2,605,119 | A |  | 7/1952 | Earnest |

(Continued)

FOREIGN PATENT DOCUMENTS

| CA | 2316584 | 2/2005 |
|---|---|---|
| CA | 2361224 | 2/2006 |

(Continued)

OTHER PUBLICATIONS

Canadian Intellectual Property Office, Requisition by the Examiner, dated Dec. 19, 2011, Related to Canadian Patent Application 2,651,688, 5 pages.

(Continued)

*Primary Examiner* — Alfred J Wujciak
(74) *Attorney, Agent, or Firm* — Mathieu Audet

(57) ABSTRACT

There is provided a securing mechanism for securing a strut portion to an I-beam, the securing mechanism comprising a pair of clamps, each including a gripping portion, a securing portion, an abutting portion and a fastener for applying tension on the clamps toward each other for moving the clamps toward each other. A kit thereof and a method of installing the securing mechanism are also contemplated in the present application.

20 Claims, 25 Drawing Sheets

(56) References Cited

U.S. PATENT DOCUMENTS

| | | | |
|---|---|---|---|
| 3,556,452 A * | 1/1971 | Ramsey | F21V 21/112 |
| | | | 248/228.5 |
| 3,711,146 A | 1/1973 | Madzsar | |
| 3,775,917 A | 12/1973 | Struben | |
| 3,848,508 A | 11/1974 | Bullinger | |
| 3,854,769 A | 12/1974 | Saunders | |
| 4,119,339 A | 10/1978 | Heimburger | |
| 4,214,787 A | 7/1980 | Chain | |
| 4,261,149 A | 4/1981 | Gustafson | |
| 4,262,953 A | 4/1981 | McErlane | |
| 4,291,911 A | 9/1981 | Gallmeyer | |
| 4,386,801 A | 6/1983 | Chapman | |
| 4,397,496 A | 8/1983 | Drygas, III | |
| 4,402,537 A | 9/1983 | Gallitzendorfer | |
| 4,418,853 A | 12/1983 | Shaffer | |
| 4,421,354 A | 12/1983 | Lemaster | |
| 4,451,074 A | 5/1984 | Scanlon | |
| 4,458,936 A | 7/1984 | Mulholland | |
| 4,486,046 A | 12/1984 | Whitney | |
| 4,511,170 A | 4/1985 | Sankrithi | |
| 4,560,195 A | 12/1985 | Price | |
| 4,585,262 A | 4/1986 | Parks | |
| 4,611,847 A | 9/1986 | Sullivan | |
| 4,616,869 A | 10/1986 | Sacco | |
| 4,640,541 A | 2/1987 | FitzGerald | |
| 4,746,160 A | 5/1988 | Wiesemeyer | |
| 4,826,113 A * | 5/1989 | Winters | F16L 3/18 |
| | | | 248/228.3 |
| 4,882,887 A | 11/1989 | Giles | |
| 5,078,448 A | 1/1992 | Selzer | |
| 5,094,503 A | 3/1992 | Dare-Bryan | |
| 5,280,990 A | 1/1994 | Rinard | |
| 5,358,210 A | 10/1994 | Simon | |
| 5,465,669 A | 11/1995 | Andrus | |
| 5,498,059 A | 3/1996 | Switlik | |
| 5,536,062 A | 7/1996 | Spears | |
| 5,609,384 A | 3/1997 | Loewen | |
| 5,788,321 A | 8/1998 | McHorse | |
| 5,863,020 A * | 1/1999 | Olson | A62B 35/0056 |
| | | | 248/228.3 |
| 5,921,617 A | 7/1999 | Loewen | |
| 6,017,013 A | 1/2000 | Simonian | |
| 6,257,654 B1 | 7/2001 | Boivin | |
| 6,354,399 B1 * | 3/2002 | Austin | A62B 35/0087 |
| | | | 182/3 |
| 6,485,087 B1 | 11/2002 | Roberge | |
| 6,520,705 B2 * | 2/2003 | Stasney, Jr. | F16B 2/065 |
| | | | 403/258 |
| 6,644,720 B2 | 11/2003 | Long | |
| 6,685,256 B1 | 2/2004 | Shermer | |
| 6,742,616 B2 | 6/2004 | Leban | |
| 6,874,842 B2 | 4/2005 | Hojna | |
| 6,932,419 B1 | 8/2005 | McCullough | |
| 6,974,178 B2 | 12/2005 | Ortega | |
| 7,040,682 B2 | 5/2006 | Tokumoto | |
| 7,073,845 B2 | 7/2006 | Ortega | |
| 7,093,889 B2 | 8/2006 | Graham | |
| 7,147,270 B1 | 12/2006 | Andrus | |
| 7,163,258 B2 | 1/2007 | Dyer, II | |
| 7,168,757 B2 | 1/2007 | Futatsuhashi | |
| 7,207,620 B2 | 4/2007 | Cosgrove | |
| 7,216,923 B2 | 5/2007 | Wong | |
| 7,404,592 B2 | 7/2008 | Reiman | |
| 7,497,502 B2 | 3/2009 | Wood | |
| 7,578,541 B2 | 8/2009 | Layfield | |
| 7,604,284 B2 | 10/2009 | Reiman | |
| 7,665,795 B2 | 2/2010 | Shishikura | |
| 7,686,385 B2 | 3/2010 | Dolan | |
| 7,740,303 B2 | 6/2010 | Wood | |
| 7,748,772 B2 | 7/2010 | Boivin | |
| 7,762,615 B2 | 7/2010 | Dayton | |
| 7,780,224 B2 | 8/2010 | Roush | |
| 7,789,453 B2 | 9/2010 | Roush | |
| 7,828,368 B2 | 11/2010 | Ortega | |
| 7,887,120 B2 | 2/2011 | Boivin | |
| 7,938,475 B2 | 5/2011 | Boivin | |
| 7,942,467 B2 | 5/2011 | Boivin | |
| 7,942,468 B2 | 5/2011 | Boivin | |
| 7,942,469 B2 | 5/2011 | Boivin | |
| 7,942,470 B2 | 5/2011 | Boivin | |
| 7,942,471 B2 | 5/2011 | Boivin | |
| D649,090 S | 11/2011 | Boivin | |
| 8,061,672 B1 * | 11/2011 | Kaufman | E04B 2/82 |
| | | | 248/228.3 |
| 8,087,715 B2 | 1/2012 | Andrus | |
| 8,186,745 B2 | 5/2012 | Graham | |
| 8,191,956 B1 | 6/2012 | Dixon, Jr. | |
| 8,210,599 B2 | 7/2012 | Butler | |
| 8,292,351 B2 | 10/2012 | Boivin | |
| 8,449,017 B2 | 5/2013 | Boivin | |
| 8,480,041 B2 * | 7/2013 | Myers | F16B 2/12 |
| | | | 248/72 |
| 8,608,122 B2 | 12/2013 | Mancina | |
| 8,678,474 B1 | 5/2014 | Boivin | |
| 9,506,488 B2 | 11/2016 | Mancina | |
| 9,957,991 B2 | 5/2018 | Mancina | |
| 2002/0021023 A1 | 2/2002 | Leban | |
| 2003/0057736 A1 | 3/2003 | Long | |
| 2003/0234555 A1 | 12/2003 | Hojna | |
| 2004/0155485 A1 | 8/2004 | Hamnett | |
| 2005/0056117 A1 | 3/2005 | Jones | |
| 2005/0146161 A1 | 7/2005 | Uland | |
| 2005/0161976 A1 | 7/2005 | Ortega | |
| 2006/0103167 A1 | 5/2006 | Wong | |
| 2006/0115988 A1 | 6/2006 | Lenski | |
| 2006/0152038 A1 | 7/2006 | Graham | |
| 2006/0273625 A1 | 12/2006 | Andrus | |
| 2007/0046066 A1 | 3/2007 | Cosgrove | |
| 2007/0120397 A1 | 5/2007 | Layfield | |
| 2007/0132278 A1 | 6/2007 | Lester | |
| 2007/0176466 A1 | 8/2007 | Dolan | |
| 2007/0257512 A1 | 11/2007 | Anderson | |
| 2008/0048468 A1 | 2/2008 | Holubar | |
| 2008/0061597 A1 | 3/2008 | Reiman | |
| 2008/0061598 A1 | 3/2008 | Reiman | |
| 2008/0093887 A1 | 4/2008 | Wood | |
| 2008/0179916 A1 | 7/2008 | Breakfield | |
| 2008/0238139 A1 | 10/2008 | Cardolle | |
| 2008/0303309 A1 | 12/2008 | Dayton | |
| 2008/0303311 A1 | 12/2008 | Roush | |
| 2009/0146453 A1 | 6/2009 | Ortega | |
| 2009/0160214 A1 | 6/2009 | Alguera | |
| 2009/0189414 A1 | 7/2009 | Boivin | |
| 2009/0195017 A1 | 8/2009 | Wood | |
| 2009/0212595 A1 | 8/2009 | Heppel | |
| 2009/0212596 A1 | 8/2009 | Reiman | |
| 2009/0218848 A1 | 9/2009 | Boivin | |
| 2009/0230726 A1 | 9/2009 | Reiman | |
| 2010/0066123 A1 | 3/2010 | Ortega | |
| 2010/0096880 A1 | 4/2010 | Boivin | |
| 2010/0096881 A1 | 4/2010 | Boivin | |
| 2010/0096882 A1 | 4/2010 | Boivin | |
| 2010/0096883 A1 | 4/2010 | Boivin | |
| 2010/0098481 A1 | 4/2010 | Boivin | |
| 2010/0117396 A1 | 5/2010 | Dayton | |
| 2010/0187856 A1 | 7/2010 | Boivin | |
| 2010/0231000 A1 | 9/2010 | Andrus | |
| 2010/0264691 A1 | 10/2010 | Giromini | |
| 2011/0204677 A1 | 8/2011 | Wood | |
| 2011/0233960 A1 | 9/2011 | Heinz | |
| 2011/0285167 A1 | 11/2011 | Butler | |
| 2012/0032475 A1 | 2/2012 | Grandominico | |
| 2012/0074728 A1 | 3/2012 | Senatro | |
| 2012/0091754 A1 | 4/2012 | Lee | |
| 2012/0200113 A1 | 8/2012 | Brown | |
| 2012/0211617 A1 | 8/2012 | Mancina et al. | |
| 2014/0072364 A1 | 3/2014 | Mancina et al. | |
| 2017/0114811 A1 | 4/2017 | Mancina et al. | |
| 2018/0187708 A1 | 7/2018 | Mancina et al. | |

(56) References Cited

U.S. PATENT DOCUMENTS

FOREIGN PATENT DOCUMENTS

| CA | 2797778 | 7/2009 |
|---|---|---|
| CA | 2802907 | 7/2009 |
| CA | 129387 | 9/2009 |
| CA | 131712 | 9/2009 |
| CA | 2689749 | 4/2012 |
| CA | 2689745 | 12/2012 |
| CA | 2689746 | 12/2012 |
| CA | 2689751 | 12/2012 |
| CA | 2651688 | 4/2013 |
| CA | 2668323 | 4/2013 |
| CA | 2689747 | 4/2013 |
| CA | 2689748 | 10/2013 |
| EP | 1870322 | 12/2007 |
| GB | 2238762 | 6/1991 |
| GB | 2271323 | 4/1994 |
| JP | 6012378 | 1/1985 |
| JP | 200219574 | 1/2002 |
| WO | WO2006115988 | 11/2006 |

OTHER PUBLICATIONS

Canadian Intellectual Property Office, Requisition by the Examiner, dated May 11, 2011, Related to Canadian Patent Application 2,651,688, 2 pages.
Canadian Intellectual Property Office, Requisition by the Examiner, dated Jul. 23, 2010, Related to Canadian Patent Application 2,651,688, 3 pages.
Canadian Intellectual Property Office, Requisition by the Examiner, dated May 19, 2011, Related to Canadian Patent Application 2,651,688, 5 pages.
Canadian Intellectual Property Office, Requisition by the Examiner, dated Jun. 7, 2010, Related to Canadian Patent Application 2,668,323, 2 pages.
Canadian Intellectual Property Office, Requisition by the Examiner, dated Dec. 20, 2011, Related to Canadian Patent Application 2,668,323, 3 pages.
Canadian Intellectual Property Office, Requisition by the Examiner, dated Apr. 26, 2011, Related to Canadian Patent Application 2,668,323, 5 pages.
Canadian Intellectual Property Office, Requisition by the Examiner, dated May 25, 2012, Related to Canadian Patent Application 2,668,323, 3 pages.
Canadian Intellectual Property Office, Requisition by the Examiner, dated Nov. 7, 2011, Related to Canadian Patent Application 2,689,745, 3 pages.
Canadian Intellectual Property Office, Requisition by the Examiner, dated Oct. 28, 2011, Related to Canadian Patent Application 2,689,746, 4 pages.
Canadian Intellectual Property Office, Requisition by the Examiner, dated Oct. 28, 2011, Related to Canadian Patent Application 2,689,747, 4 pages.
Canadian Intellectual Property Office, Requisition by the Examiner, dated Oct. 28, 2011, Related to Canadian Patent Application 2,689,751, 2pages.
Canadian Intellectual Property Office, Requisition by the Examiner, dated Oct. 28, 2011, Related to Canadian Patent Application 2,689,748, 3 pages.
Canadian Intellectual Property Office, Requisition by the Examiner, dated Jul. 4, 2012, Related to Canadian Patent Application 2,689,748, 3 pages.
Canadian Intellectual Property Office, Requisition by the Examiner, dated Jun. 4, 2010, Related to Canadian Patent Application 2,689,749, 3 pages.
Canadian Intellectual Property Office, Requisition by the Examiner, dated Apr. 26, 2011, Related to Canadian Patent Application 2,689,749, 2 pages.
Supplemental Information to Protest, by third party, dated May 22, 2012, Related to Canadian Patent Application 2,668,323, 17 pages.
Request for Exparte Reexamination of U.S. Pat. No. 7,887,120, 279 pages. dated Jun. 5, 2012.
Equest for Exparte Reexamination of U.S. Pat. No. 7,748,772, 77 pages. dated Apr. 13, 2012.
Request for Exparte Reexamination of U.S. Pat. No. 7,748,772, 11 pages. dated May 10, 2012.
Complaints for Declaratory Judgement; Case No. 2:11CV840, Sep. 19, 2011, 7 pages.
Request for Exparte Reexamination of U.S. Pat. No. 7,942,467, 195 pages. dated Jun. 7, 2012.
Request for Exparte Reexamination of U.S. Pat. No. 7,942,768, 243 pages. dated Jun. 22, 2012.
Request for Exparte Reexamination of U.S. Pat. No. 7,942,469, 221 pages. dated Jun. 20, 2012.
Request for Exparte Reexamination of U.S. Pat. No. 7,938,475, 40 pages. dated May 14, 2012.
Request for Exparte Reexamination of U.S. Pat. No. 7,942,470, 242 pages. dated Jun. 21, 2012.
Request for Exparte Reexamination of U.S. Pat. No. 7,942,471, 230 pages. dated Jun. 25, 2012.
Mechanically fastened composite side-door impact beams for passenger cars designed for shear-out failure modes ; Tae Seong Lim; Dai Gil Lee Mechanical Design Laboratory with Advanced Materials, Department of Mechanical Enginering, Korea Advanced Institute of Science and Technology. Me3221, 373-1 Gusong-dong, Yusong-gu, Daejon-shi 305-701, Korea, Republic of Journal: Composite structures, 2002, 56 (2) 211-221 ISSN: 0263-8223 CODEN: COMSE2 Availability: INIST-20190 ; 354000100741520100 No. of Refs.: 19 ref. Document Type: P (Serial) ; A (Analytic) Country of Publication: United Kingdom Language: English.
An experimental study of drag reduction devices for a trailer underbody and base; Jun. 4, 2004; J. M. Ortega, K. Salari; UCRL-CONF-204489; 34$^{th}$ AIAA Fluid Dynamic Conference and Exhibit, Portland, OR, United States, Jun. 28, 2004 through Jul. 1, 2004.
TrailerBody Builder; Internet site HTTP://trailer-bodybuilders.com/mag/trucks_trailerskirt_success/; Trailer-Skirt Success; Jan. 1, 2006, 3 pages.
Tractor-Trailer Aerodynamics, published in Trucking, Dec. 20, 2011, http://www.truckinginfo.com/hdt/arcitives/2006/03/072a0603.asp.
How to make the box aerodynamic, by Stephen Bennett, Feb. 20, 2012.

\* cited by examiner

BEAM CONNECTOR AND METHOD OF INSTALLATION THEREOF

CROSS-REFERENCE

The present application relates to and is a non-provisional application claiming priority from U.S. Provisional Patent Application No. 62/314,062, filed Mar. 28, 2016, entitled BEAM CONNECTOR AND METHOD OF INSTALLATION THEREOF, which is incorporated herein by reference in its entirety.

FIELD OF THE INVENTION

This invention generally relates to a mechanism for securing aerodynamic apparatus components to a vehicle. More precisely, the invention relates to a structural member connector for securing aerodynamic trailer skirts to a vehicle to improve the aerodynamic efficiency of the vehicle.

BACKGROUND OF THE INVENTION

Road tractors are used to pull semi-trailers on roads to transport cargo. Aerodynamic apparatuses are installed on the road tractor and/or on the semi-trailer in order to reduce the aerodynamic air drag and improve fuel efficiency.

Trailer aerodynamic skirts are installed on both sides of a semi-trailer to help manage the flow of air around and underneath the trailer. Brackets are affixed to the trailer to secure the skirts thereto in a predetermined position. These aerodynamic skirts are secured to a bottom portion of the trailer, or on the sides of the trailer's floor, to ensure proper positioning when the vehicle is moving.

People who are familiar with the trucking industry know that trailers are built in various configurations. Frame portions of trailer can use members and beams of different dimensions. For example, an I-beam, that is commonly used in trailer manufacturing, also known as H-beam, W-beam (for "wide flange"), Universal Beam (UB), Rolled Steel Joist (RSJ), or double-T, is a beam with an I or H-shaped cross-section. The horizontal elements of the "I" are known as flanges, while the vertical element is termed the "web". I-beams are usually made of structural steel, or aluminum, and are used in construction and civil engineering. The web resists shear forces, while the flanges resist most of the bending moment experienced by the beam. Beam theory shows that the I-shaped section is a very efficient form for carrying both bending and shear loads in the plane of the web.

The skirts, because of their position under the trailer's floor and their proximity with the road, are significantly vulnerable and might easily enter in contact with surrounding obstacles. Portions of the securing member holding the skirts, when put under significant stress, plastically bend and/or break to affect the skirts' position in respect to the semi-trailer thus reducing the efficiency of the skirts. Additionally, the assembly can be crooked or not precisely aligned, which is causing additional challenges for securing the aerodynamic skirt assembly to the vehicle.

Known securing members holding the aerodynamic skirts to the trailer are tedious to install. Tools are required to mount the securing member to the trailer. A significant amount of time is needed to properly locate, adjust and secure the aerodynamic skirts on the trailer.

Therefore, there exists a need in the art for an improved aerodynamic skirt assembly over the existing art. There is a need in the art for a securing member that is adapted to be installed on members and beams of different sizes and configurations. There is also a need for such a resilient skirt assembly that can be easily installed and economically manufactured.

SUMMARY OF THE INVENTION

It is one aspect of the present invention to alleviate one or more of the drawbacks of the background art by addressing one or more of the existing needs in the art.

Accordingly, embodiments of this invention provide an improved trailer aerodynamic skirt assembly over the prior art that is efficient to install, adjust and offers a level of flexibility to the aerodynamic skirt assembly.

An aspect of one or more embodiments of the invention provides a skirt assembly adapted to be installed on semi-trailers of different configurations to reduce the aerodynamic drag produced by the movement of the semi-trailer when pulled by a tractor.

An aspect of one or more embodiments of the invention provides an aerodynamic skirt support mechanism adapted to be manually installed on a semi-trailer to secure a pair of aerodynamic skirt panels on a trailer, the support mechanism being configured to secure an upper portion and a lower portion of the aerodynamic skirt panels.

An aspect of one or more embodiments of the invention provides a securing member securing a resilient skirt assembly that is adapted to bend when it contacts a foreign object and to self-recover its original position and shape thereafter.

An aspect of one or more embodiments of the invention provides a connector portion that is adapted to be secured to I-beams of different sizes and/or thicknesses.

An aspect of one or more embodiments of the invention provides a pair of connector portions achieving a force in a direction that is not aligned with a tension exercised by fasteners securing the pair of connector portions together.

An aspect of one or more embodiments of the invention provides a gripping portion including an angled beam-contacting portion for transferring pressure on a portion of the I-beam that is applied in two simultaneous different directions.

An aspect of one or more embodiments of the invention provides a connector portion engaging through a corresponding strut portion for securing the strut portion to a beam.

An aspect of one or more embodiments of the invention provides a pair of securing connectors mirroring each other, the pair of securing connectors can be secured together with one or more fasteners and with an optional spring member, that can also be an elastic, intervening therebetween to maintain a relative position between the securing connectors.

An aspect of one or more embodiments of the invention provides a pair of securing connectors mirroring and contacting each other at a lower portion thereof, when securing the connectors together with one or more fasteners, to prevent rotation of the flanges before reaching a desired securing tension with the fastener(s).

Another aspect of one or more embodiments of the invention provides a beam connector for securing an aerodynamic skirt to a trailer that can be easily installed and economically manufactured.

An aspect of one or more embodiments of the invention provides a beam connector that is made of sheet metal generally bent in a single plane.

An aspect of one or more embodiments of the invention provides a beam connector made of two identical connector portions.

An aspect of one or more embodiments of the invention provides a beam-connector designed to squeeze a flat portion of an I-beam in a beam-receiving portion.

An aspect of one or more embodiments of the invention provides an aerodynamic skirt support mechanism adapted to be compatible with I-beam of different widths and thicknesses.

An aspect of one or more embodiments of the invention provides a beam connector adapted to be adjusted by sliding along an I-beam under a trailer.

An aspect of one or more embodiments of the invention provides an aerodynamic skirt support mechanism adapted to be installed under a trailer without intervening with the land-gear of the trailer.

Another aspect of one or more embodiments of the invention provides member supports made of a rustproof material.

One other embodiment of the invention provides a method of installing a skirt assembly on a trailer comprising installing and fastening a portion of a skirt panel, with a securing member, substantially on the edge of a trailer floor and securing a forwardmost portion of the skirt panel at a predetermined position on the trailer to define the shape of the skirt panel.

One embodiment of the invention provides a securing mechanism for securing a strut portion to an I-beam, the securing mechanism comprising a pair of clamps, each including a gripping portion, a securing portion, an abutting portion and a fastener for applying tension on the clamps toward each other for moving the clamps toward each other.

One additional embodiment of the invention provides a securing mechanism kit for securing a strut portion to an I-beam, the securing mechanism kit comprising a pair of clamps, each including a gripping portion, a securing portion, an abutting portion and a fastener for applying tension on the clamps toward each other for moving the clamps toward each other.

Other embodiments and further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Additional and/or alternative advantages and salient features of the invention will become apparent from the following detailed description, which, taken in conjunction with the annexed drawings, disclose preferred embodiments of the invention.

BRIEF DESCRIPTION OF THE DRAWINGS

Referring now to the drawings which form a part of this original disclosure.

DETAILED DESCRIPTION OF PREFERRED EMBODIMENTS

A preferred embodiment of the present invention is described below with reference to the drawings.

Figure 1:
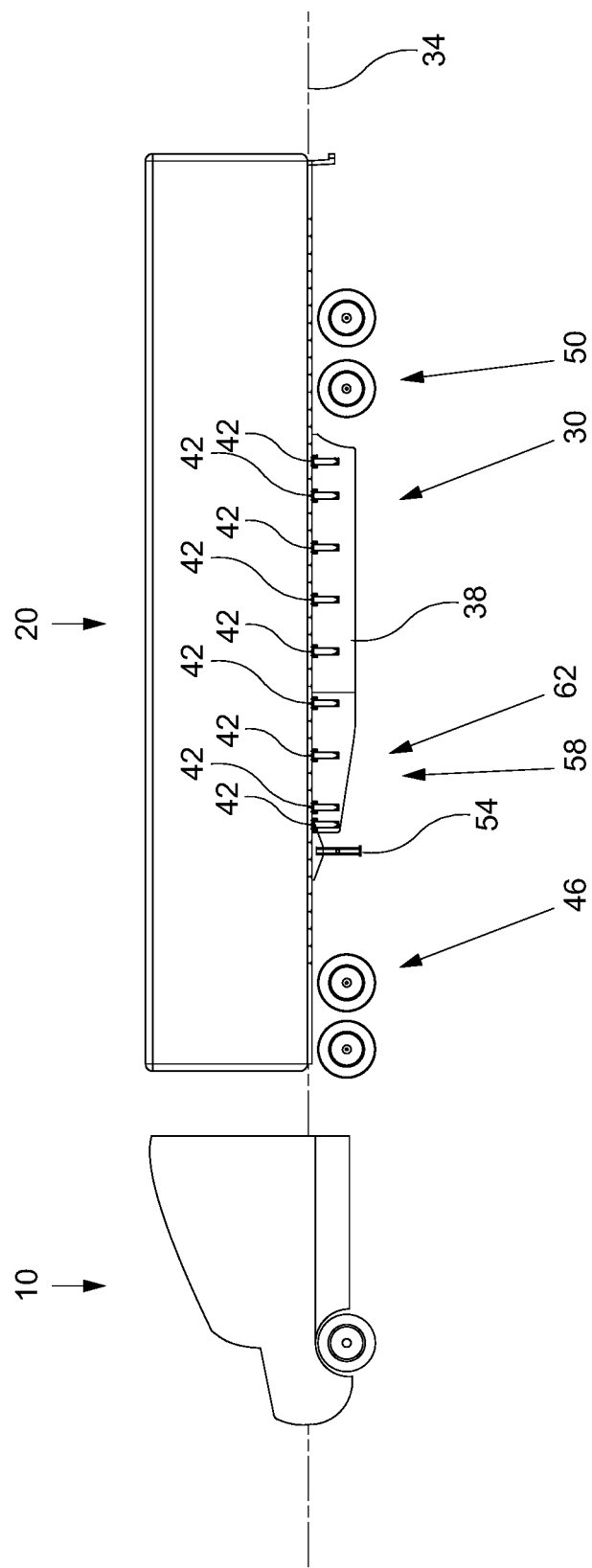
FIG. 1 is a left side elevation view of a vehicle in accordance with embodiments thereof.
Figure 2:
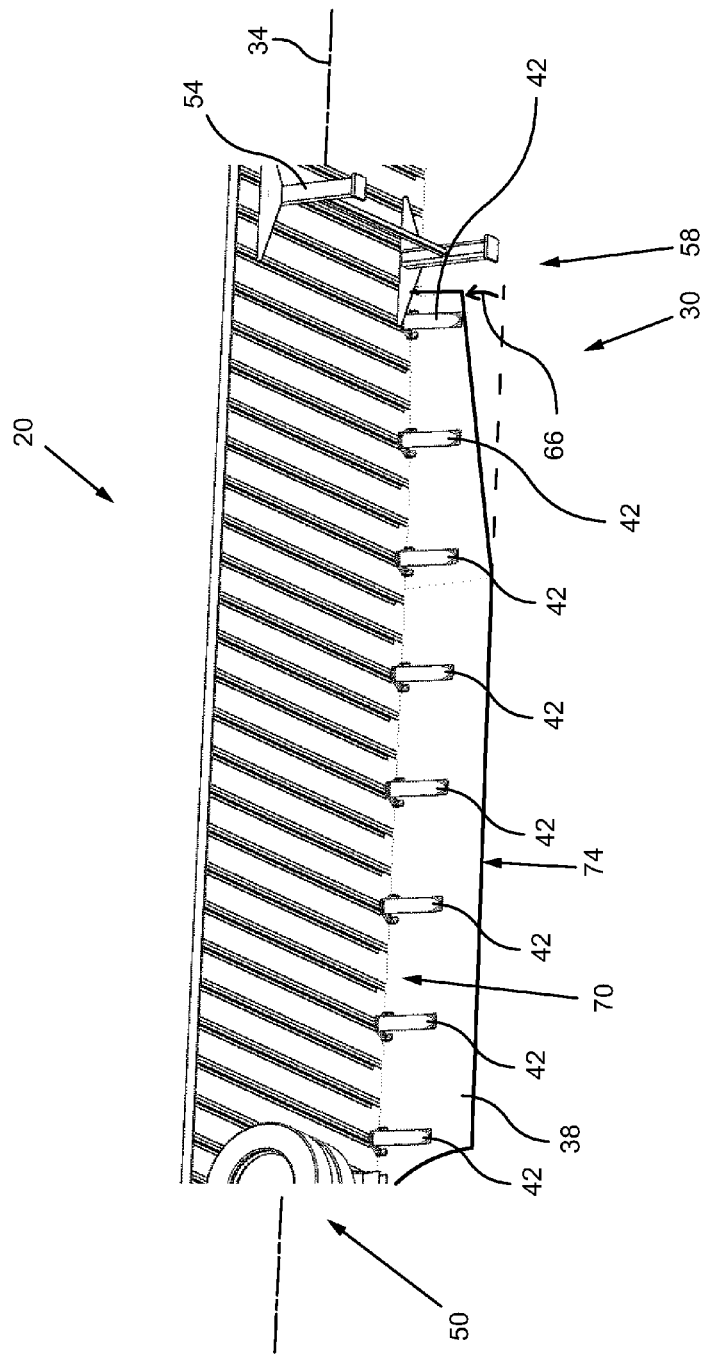
FIG. 2 is a right-bottom perspective view of a trailer in accordance with embodiments thereof.

FIG. 1 and FIG. 2 illustrate a road tractor 10 with a semi-trailer 20, also referred to as a trailer 20, attached thereto and equipped with a pair of aerodynamic skirt assemblies 30, installed on each side of the semi-trailer 20 along longitudinal axis 34, adapted to deflect and direct the airflow around the semi-trailer 20. Each skirt assembly 30 includes a skirt panel 38, adapted to be disposed on the side of the semi-trailer 20, and a plurality of securing members 42 adapted to secure the skirt panel 38 to the semi-trailer 20. The securing members 42 proximally located on sides of the trailer 20 are visible, although not clearly illustrated, because the left-side skirt panel 38 has been removed in FIG. 1 and FIG. 2 and will be discussed in more details below. Once installed on the semi-trailer 20, the skirt assembly 30 helps channel the flow of air around the semi-trailer 20 to reduce the air drag of the vehicle when the semi-trailer 20 moves forwardly on the road, pulled by the road tractor 10.

The skirt assembly 30 of the present embodiment is mostly located on the lower side edges, preferably under the semi-trailer 20, between the wheels 46 of the road tractor 10 and the wheels 50 of the semi-trailer 20. The skirt panels 38 can alternatively extend forward up to the trailer supports 54, also known as landing gears, of the semi-trailer, and be secured thereto, thus preventing complex skirt panel 38 arrangements through the securing member 42. The skirt panels 38 are substantially vertically positioned on each side of the semi-trailer 20 with a clearance with the ground by illustratively about 15-25 centimeters (about 6 to 12 inches) to prevent interferences with the ground under normal operation. The air management around the trailer 20 provided by the skirt assembly 30 reduces the air drag created by the semi-trailer 20 by directing the flow of air around the semi-trailer 20. The flow of air would otherwise turbulently move around and below the semi-trailer 20 to create substantial turbulences and air drag negatively influencing the aerodynamic efficiency of the vehicle. The airflow management around the semi-trailer 20 provided by the skirt assembly 30 helps maintain laminar airflow around the semi-trailer 20 that helps optimizing the aerodynamic efficiency of the vehicle and diminish fuel consumption of the road tractor 10. The skirt assembly 30 also improves the safety of the vehicle by providing a barrier that can significantly prevent foreign objects to get under the semi-trailer 20.

As illustrated, the skirt panel 38 is shaped with an optional progressive height 62 from a front portion 58 thereof. The skirt panels 38 can alternatively also be installed at a proximal or a distal angle (not illustrated), in respect to the vertical, on the semi-trailer 20 to change the airflow pattern around the semi-trailer 20 and more precisely adjust the aerodynamics to a specific vehicle shape.

It can be appreciated in FIG. 2 that each skirt panel 38 is installed directly on the side of the semi-trailer 20 and, when seen from above, the front portion 58 that optionally progressively proximally leans 66 toward the center 34 of the semi-trailer 20. The recessed front portion 58 of the skirt panel 38 improves the collection of the turbulent airflow generated by the road tractor 10 thus improving the aerodynamic efficiency of the skirt assembly 30. Additional explanation about the shape of the skirt panel 38 will be provided in further details below.

Figure 3:
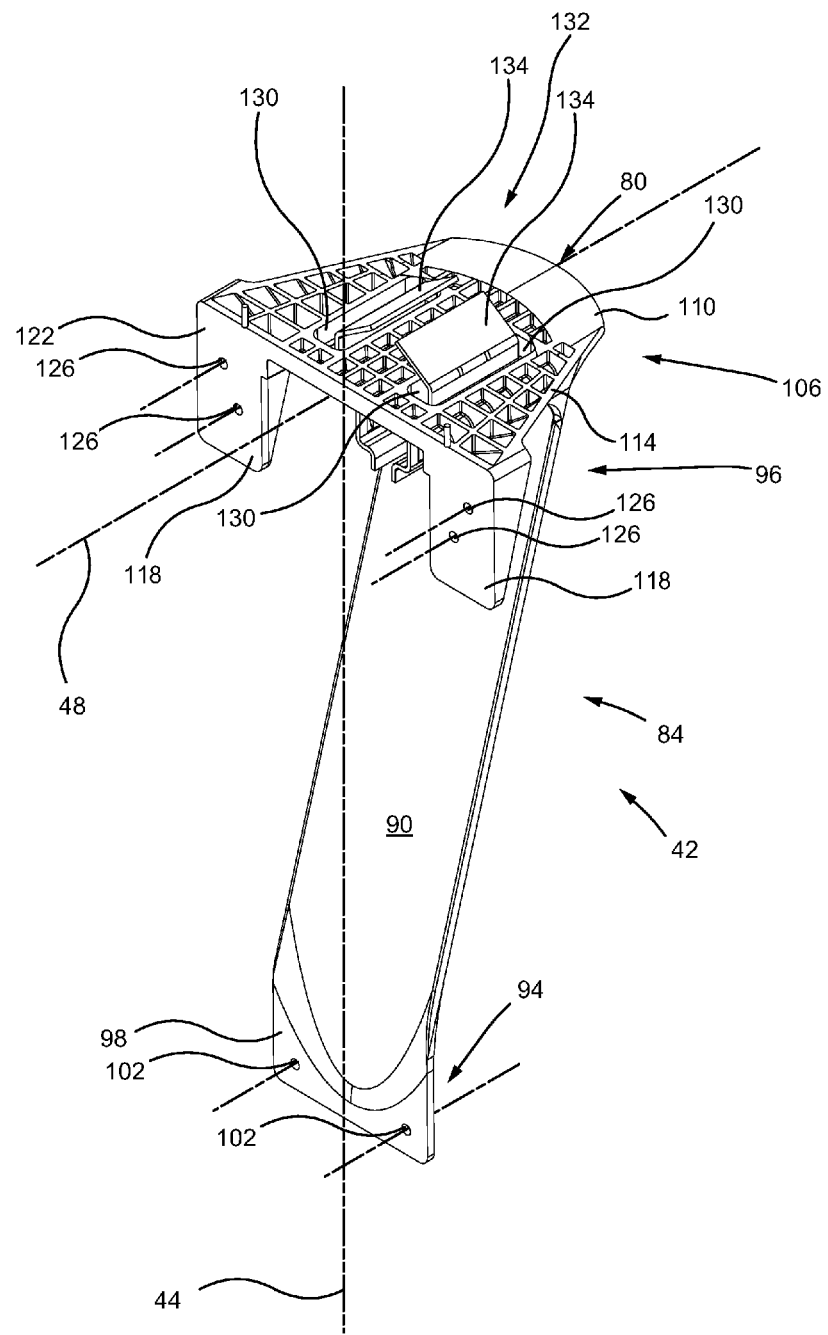
FIG. 3 is an isometric view of a securing member in accordance with embodiments thereof.
Figure 4:
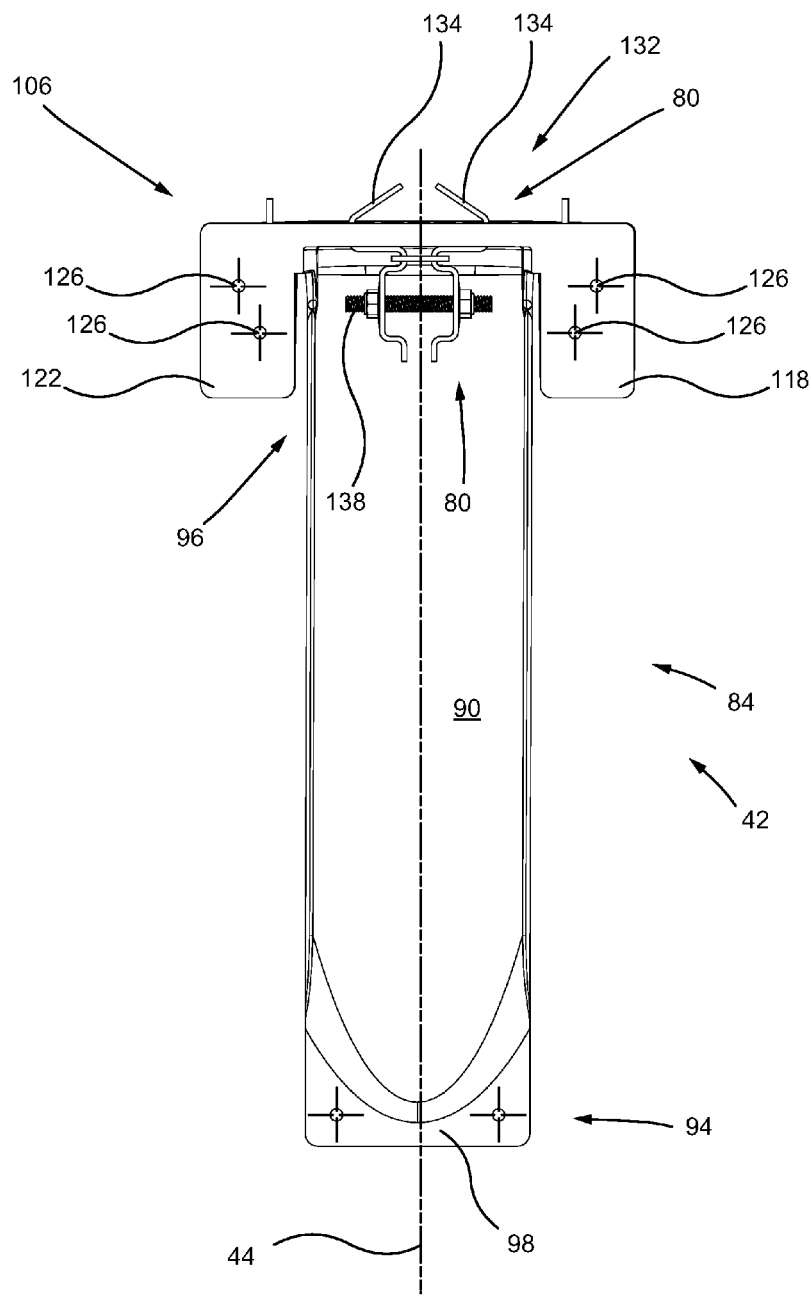
FIG. 4 is a right elevation view of a securing member in accordance with embodiments thereof.
Figure 5:
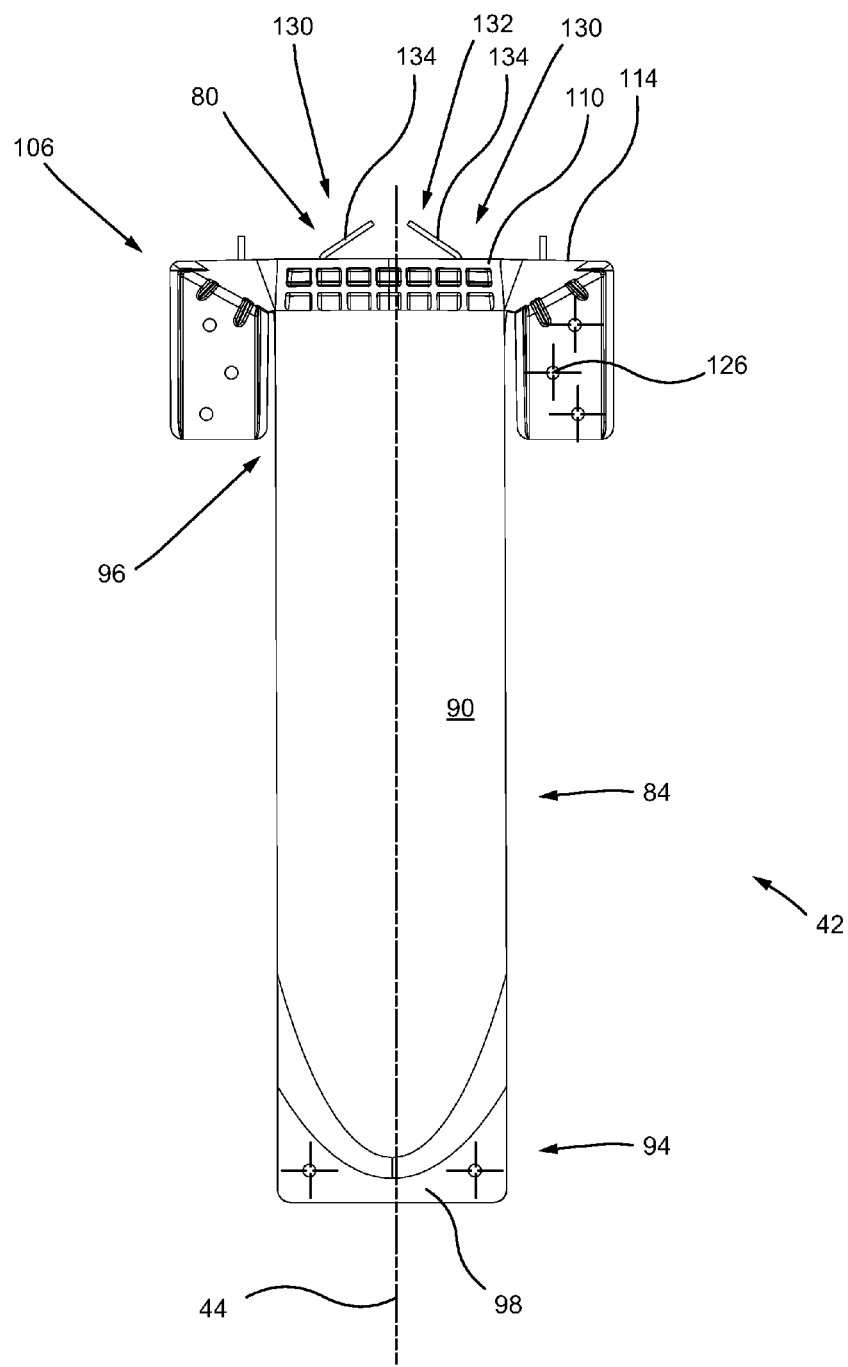
FIG. 5 is a left elevation view of a securing member in accordance with embodiments thereof.
Figure 6:
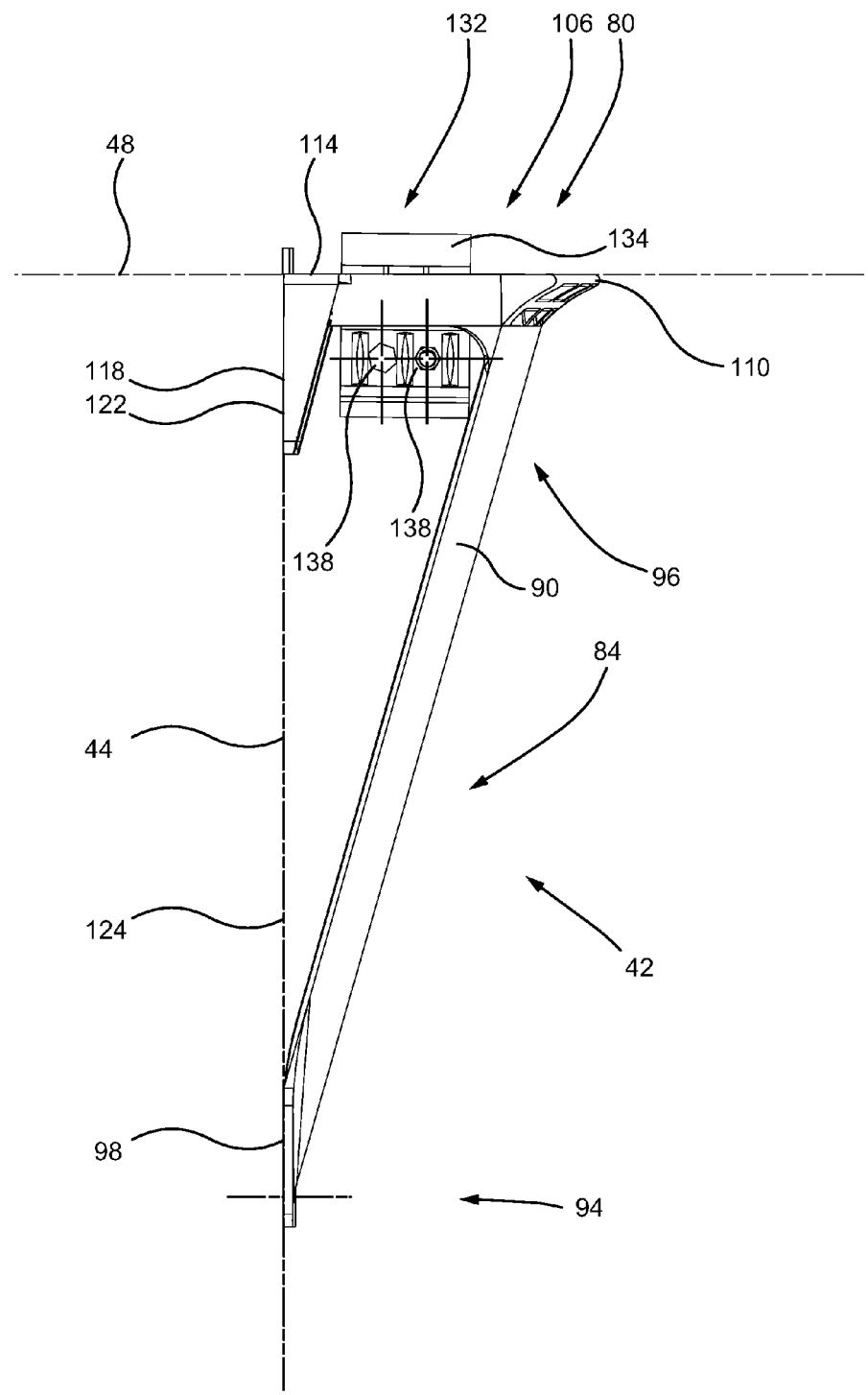
FIG. 6 is a front elevation view of a securing member in accordance with embodiments thereof.
Figure 7:
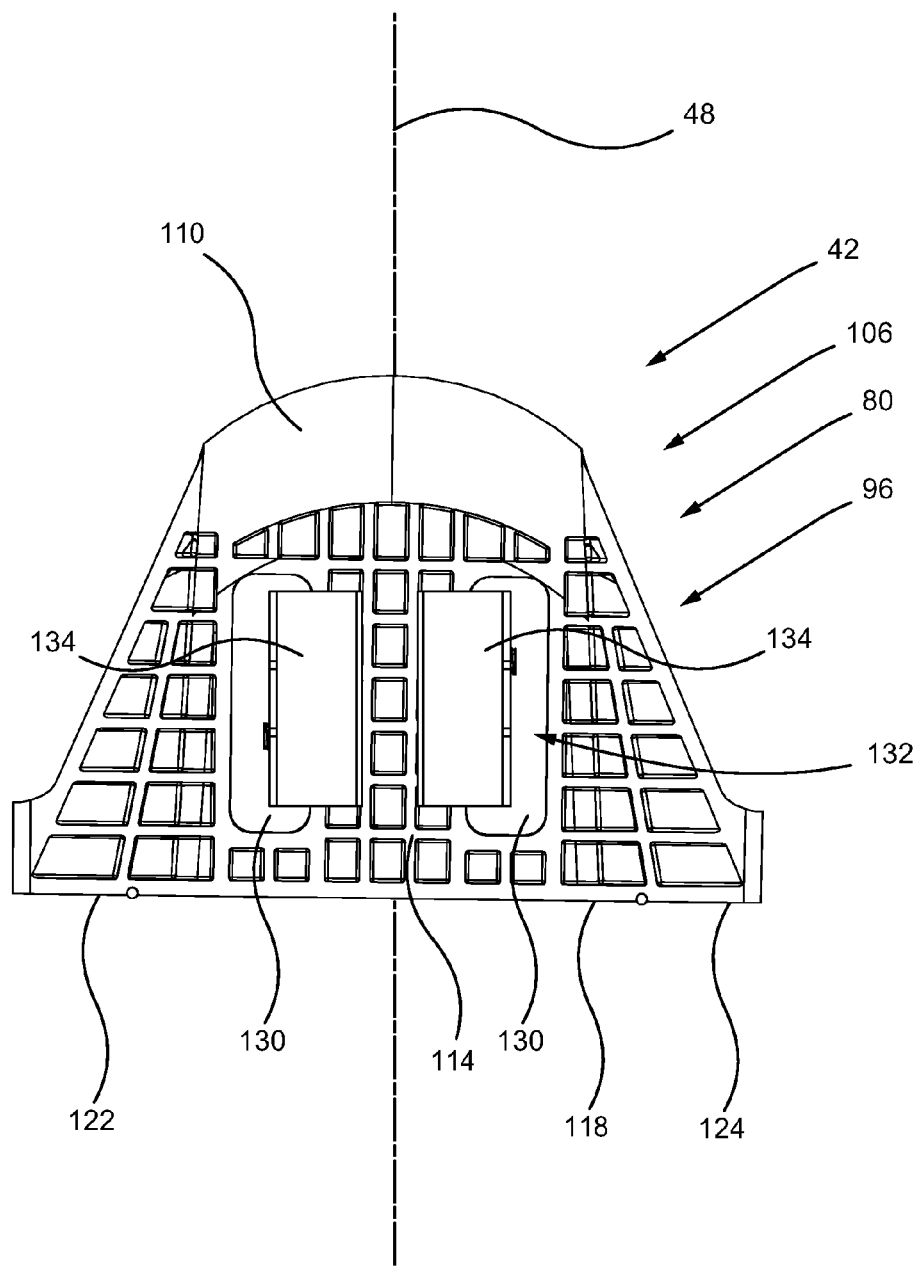
FIG. 7 is a to plan view of a securing member in accordance with embodiments thereof.

FIG. 3 throughout FIG. 7 are illustrating a securing member 42 including a connector portion 80 and a strut portion 84 both centered along vertical axis 44 and central transversal axis 48. The connector portion 80 is used to connect the securing member 42 with the trailer 20 and is embodied in these figures to also secure an upper portion 70 of the skirt panel 38. The strut portion 84 includes a strut member 90 with a lower portion 94 and an upper portion 96 thereof. The securing member 42 of the present embodiment is configured for securing the skirt panel 38 thereon at a lower portion 74 and an upper portion 96 thereof. A planar section 98 includes holes 102 therein for securing the lower portion 94 thereof with fasteners or rivets, for example. The strut portion 84 includes a securing portion 106 to which is connected the strut member 90. The securing portion 106 is configured to be assembled to the trailer 20 at its upper section with a trailer contacting portion 114, includes a stabilizer 110 and a skirt panel contacting portion 118 that is generally orthogonally disposed in respect with the skirt panel contacting portion 118 in the illustrated embodiment. The stabilizer 110 is embodied as an extension of the connector portion 80 increasing with a lever effect the securing portion 42 and is extending proximal to the longitudinal axis 34 of the trailer 20 to sustain the loads applied on the strut portion 84 that is also creating a moment on the connector portion 80. The skirt panel contacting portion 118 of the connector portion 80 includes a planar section 122 provided with a series of holes 126 therein for securing an upper portion 70 to the skirt panel 38 with fasteners or rivets, for example. Both planar section 98, 122 are preferably aligned along a unique vertical plane 124 for efficiently contacting the skirt panel 38. The trailer contacting portion 114 includes openings 130 therein to receive therein a securing mechanism 132 embodied as a pair of opposed clamps 134 to engage the structure of the trailer 20.

Figure 8:
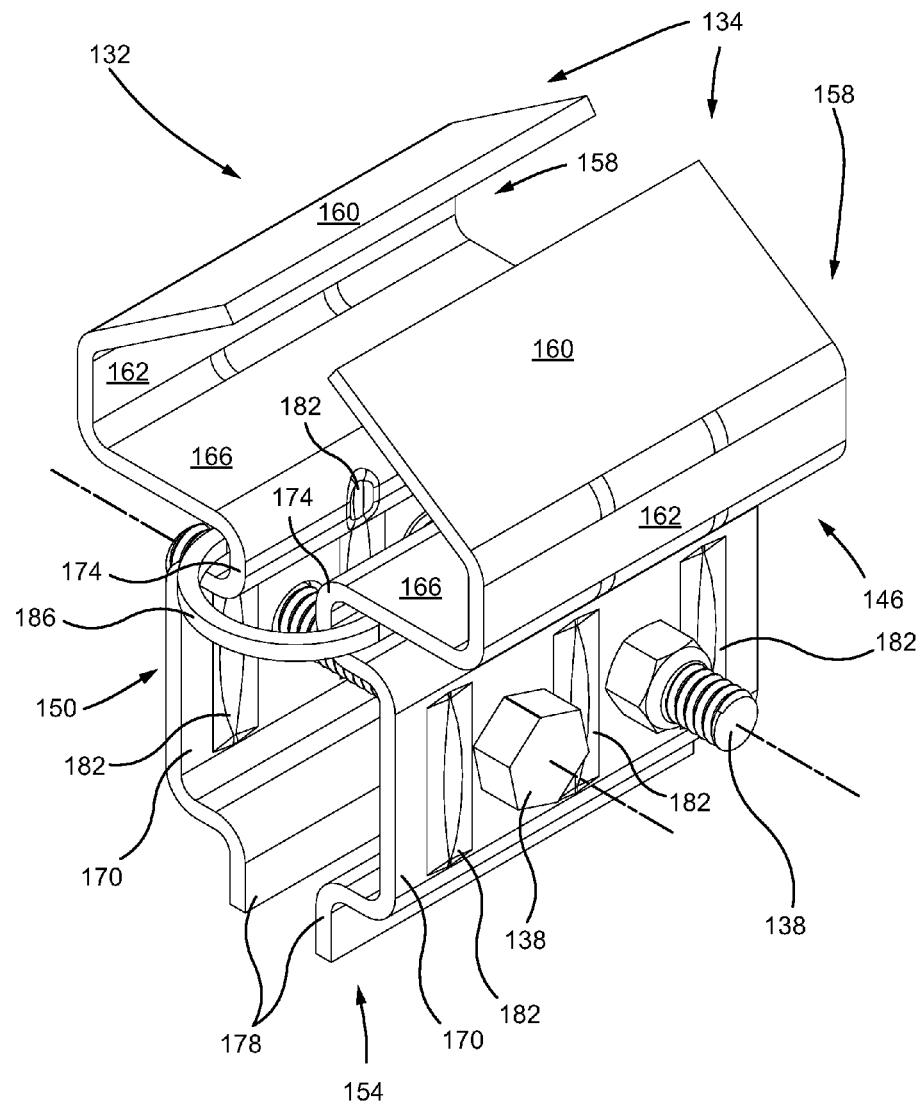
FIG. 8 is an isometric view of a securing mechanism in accordance with embodiments thereof.
Figure 13:
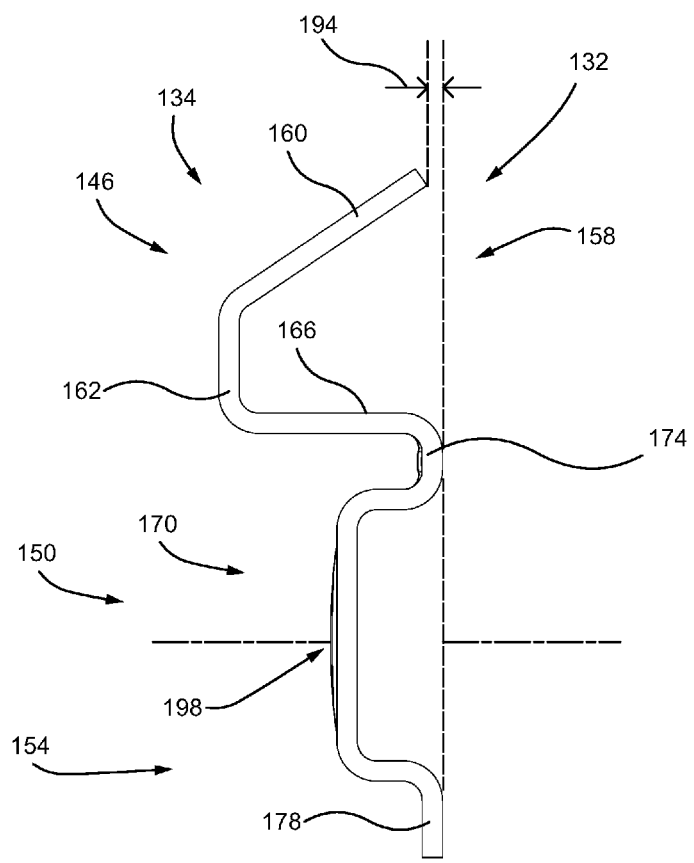
FIG. 13 is a side elevation view of a securing clamp in accordance with embodiments thereof.
Figure 14:
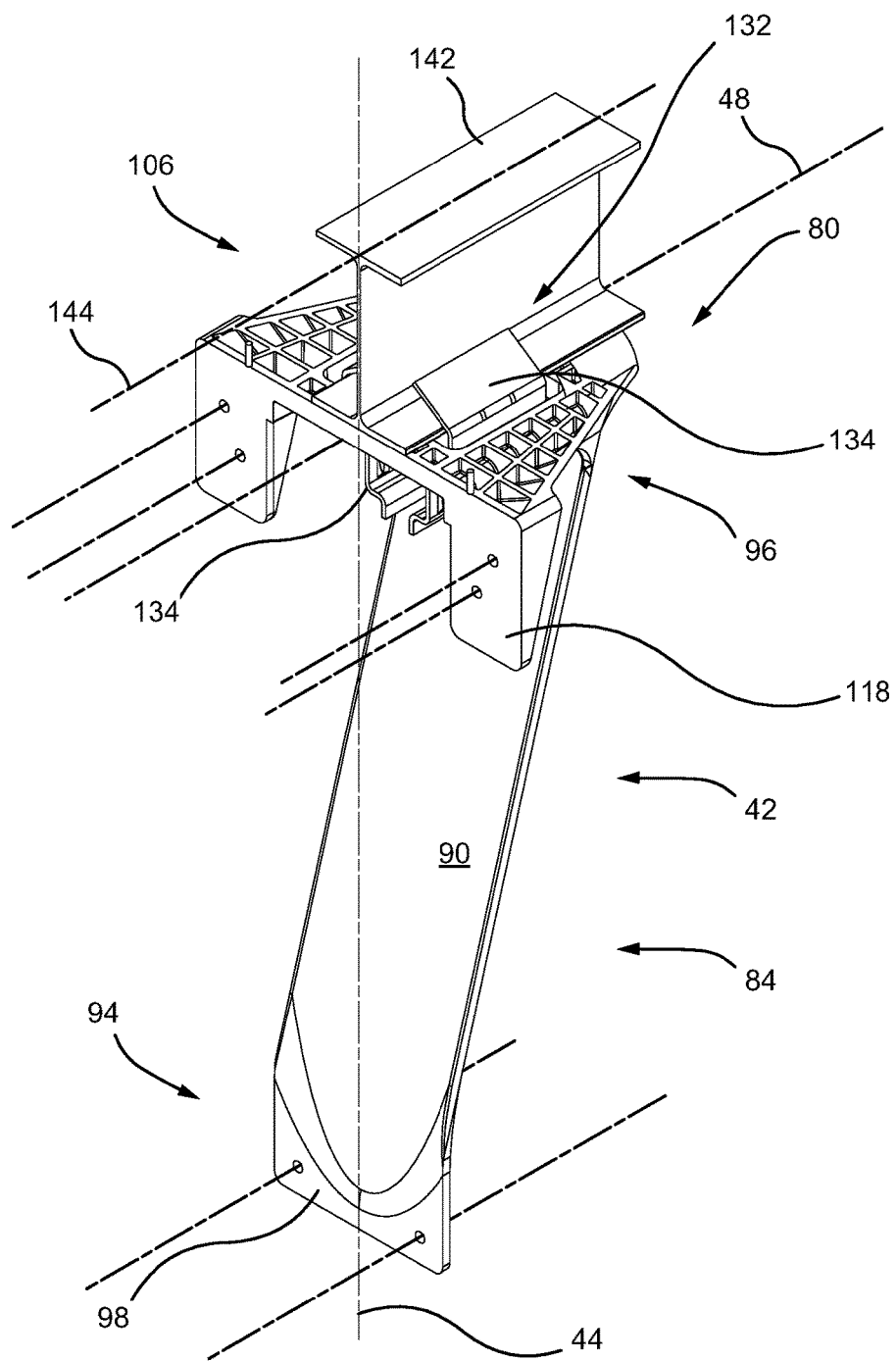
FIG. 14 is a perspective view of a securing mechanism and a securing member in accordance with embodiments thereof.
Figure 15:
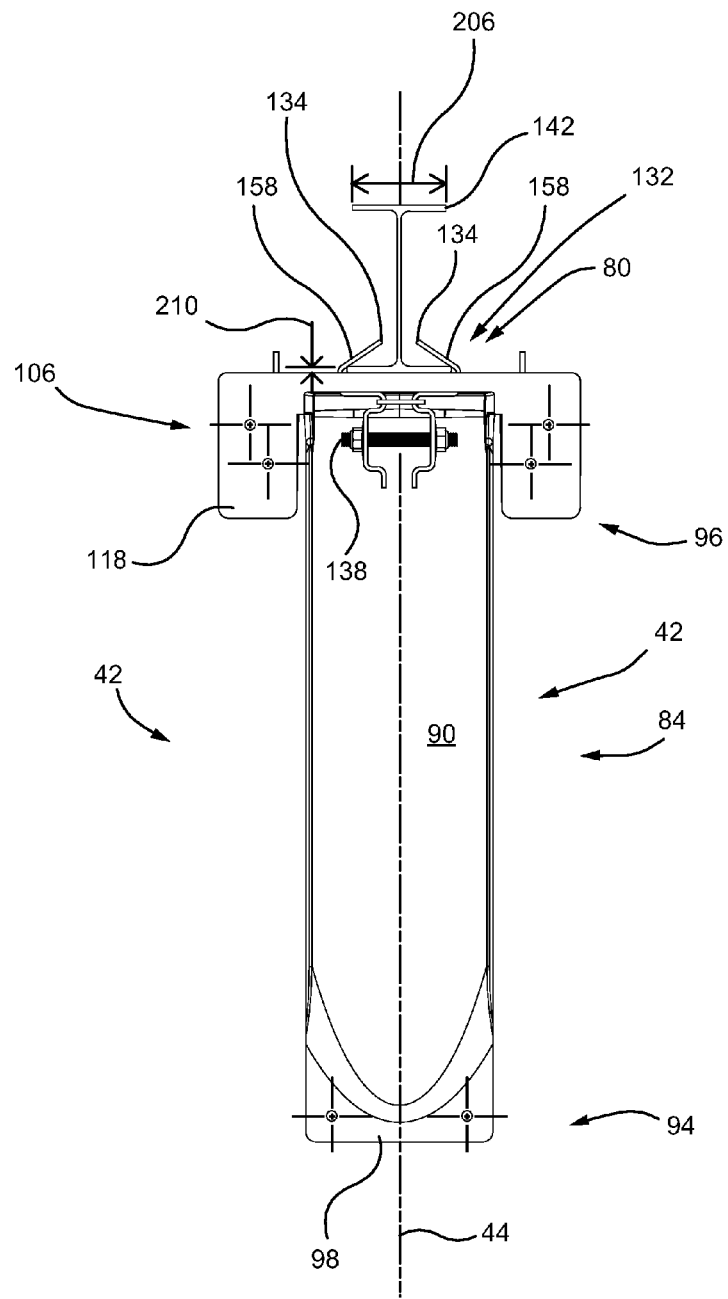
FIG. 15 is a right elevation view of a securing mechanism and a securing member in accordance with embodiments thereof.
Figure 16:
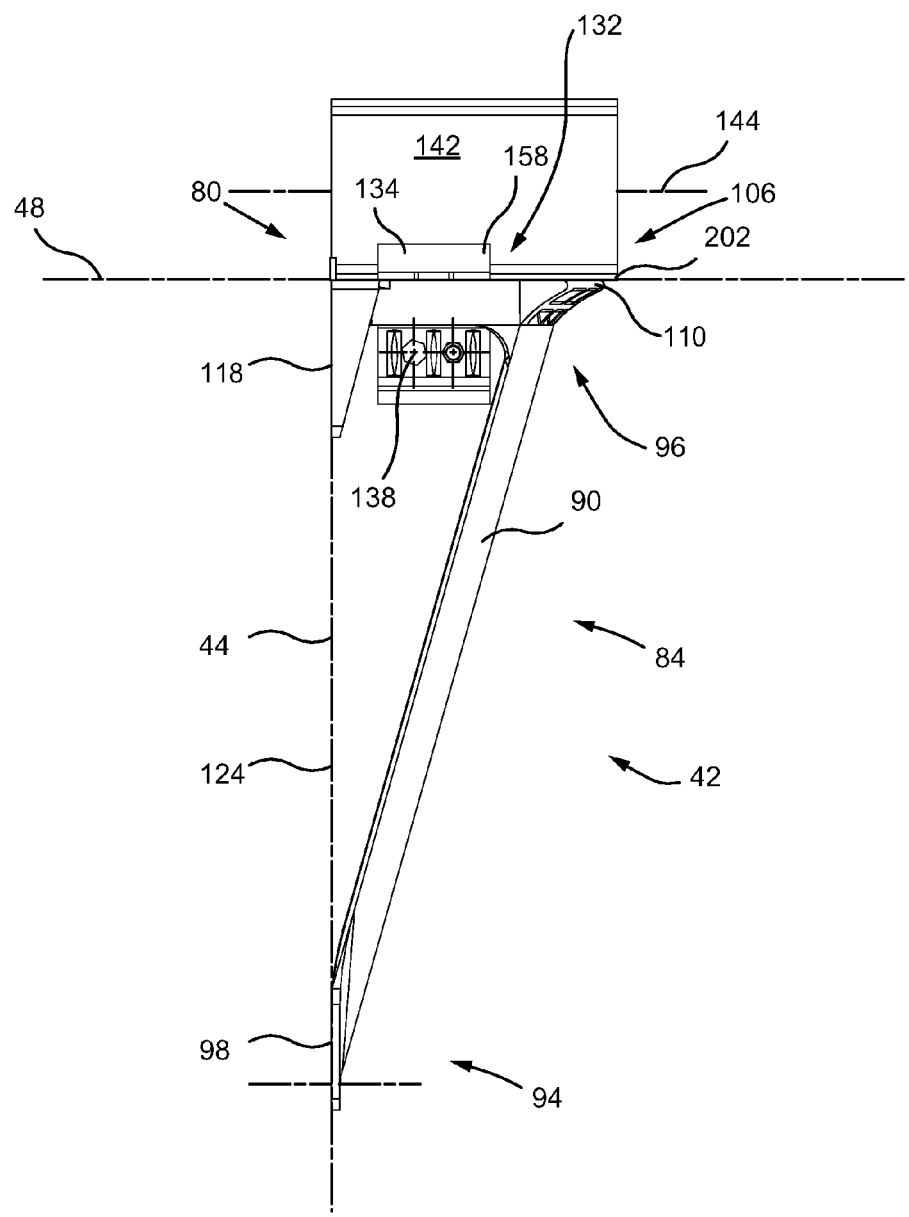
FIG. 16 is a front elevation view of a securing mechanism and a securing member in accordance with embodiments thereof.
Figure 20:
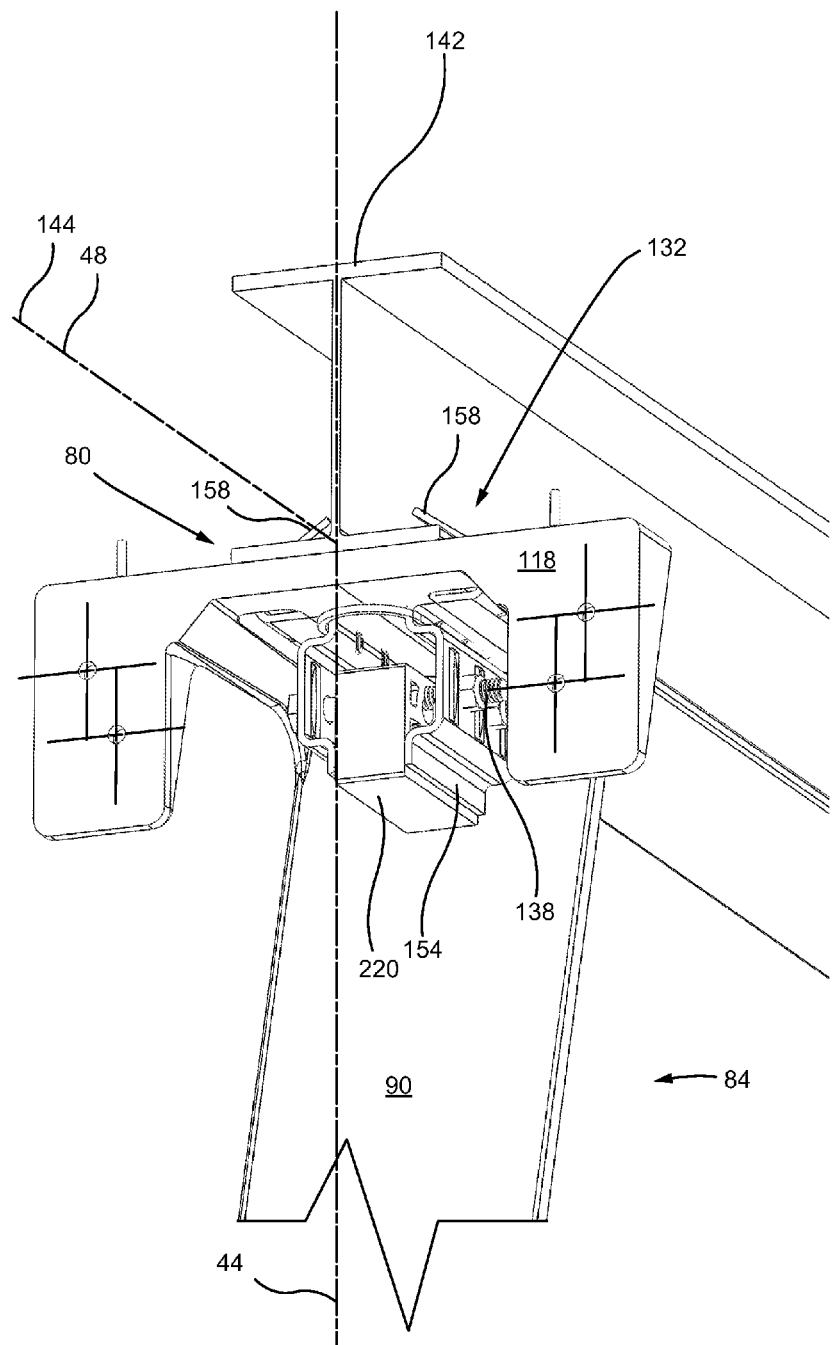
FIG. 20 is a partial perspective view of a securing mechanism and a securing member in accordance with embodiments thereof.

The securing mechanism 132 embodied two opposed clamps 134 illustrated in FIG. 8 throughout FIG. 13 are configured to be secured together with, for instance, two fasteners 138. The two opposed clamps 134 are securing together the trailer contacting portion 114 of the connector portion 80 with a lower portion of an I-beam as illustrated in FIG. 14 throughout FIG. 20. Each clamp 134 uses an inclined member 160 and two contacting portions 162, 166 for securing the connector portion 80 with the I-beam 142. We will first describe in further details the connector portion 80 before discussing the interaction between the strut portion 84, the connector portion 80 and the I-beam 142.

The connector portion 80 of the illustrated embodiment is using two similar opposed clamps 134 to simplify the assembly and lower the manufacturing cost. The clamps 134 are made of a strong material capable of withstanding significant mechanical loads and can be shaped with a punch and die process. Metal, or the like, can be used. A material resistant to corrosion, or a protective layer, is also desirable given the condition of use of the connector portion 80 to prevent rust to undesirably attack the connector portion 80.

Figure 9:
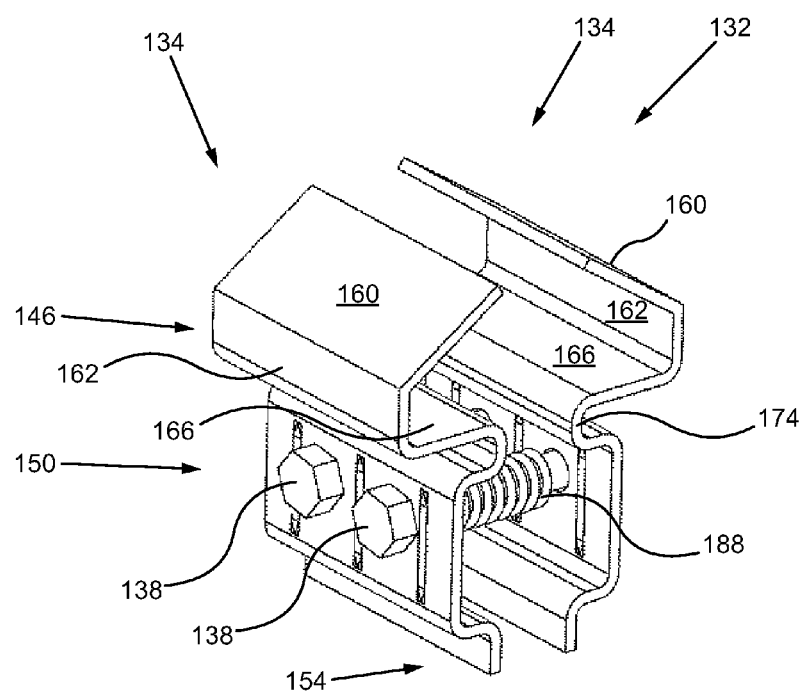
FIG. 9 is an isometric view of a securing mechanism in accordance with embodiments thereof.
Figure 10:
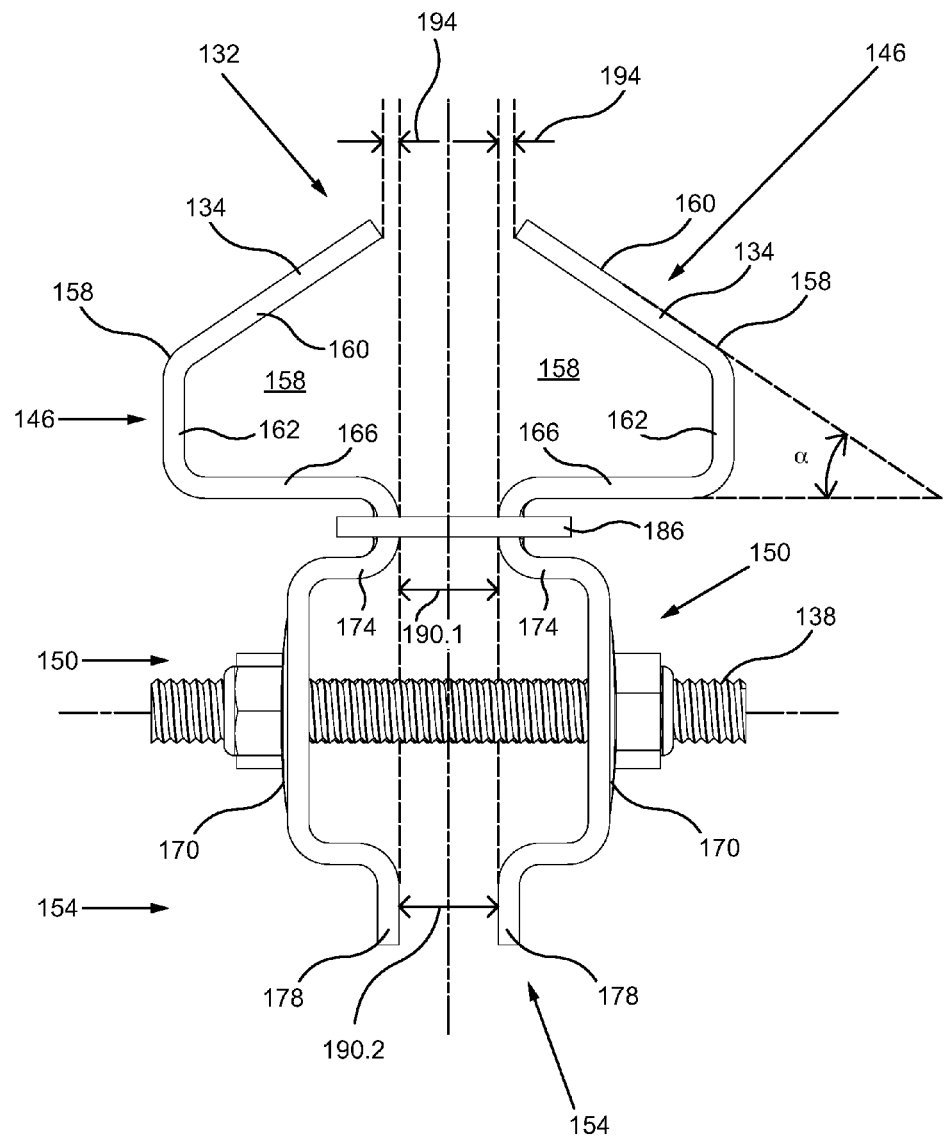
FIG. 10 is a side elevation view of a securing mechanism in accordance with embodiments thereof.
Figure 11:
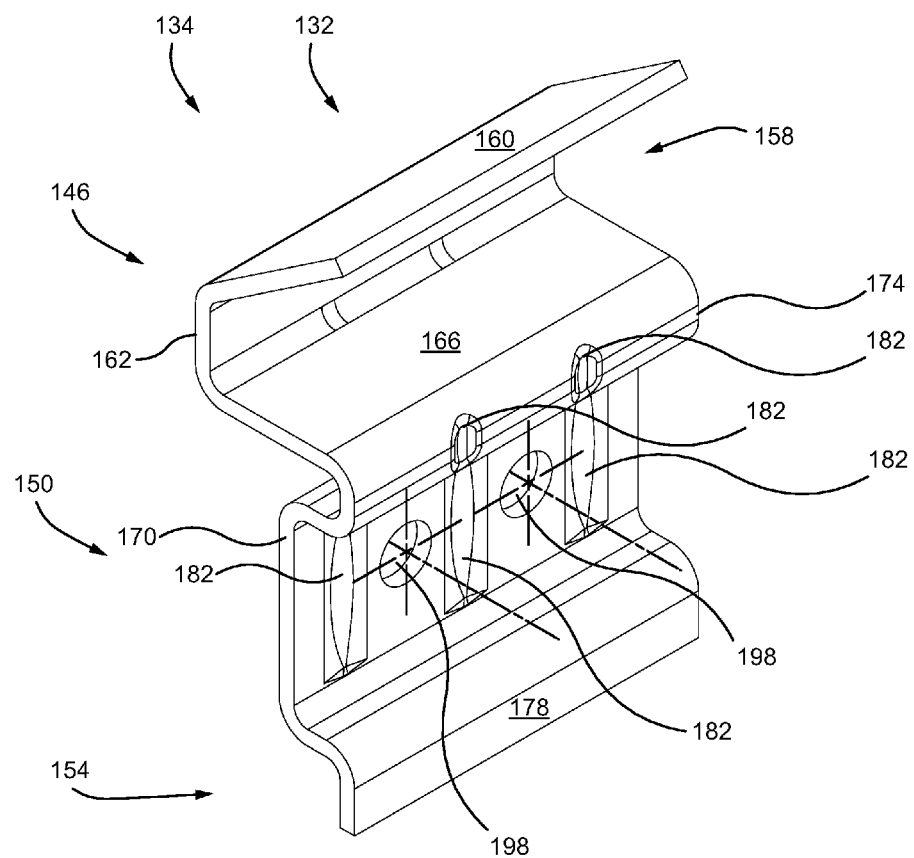
FIG. 11 is a perspective view of a securing mechanism in accordance with embodiments thereof.
Figure 12:
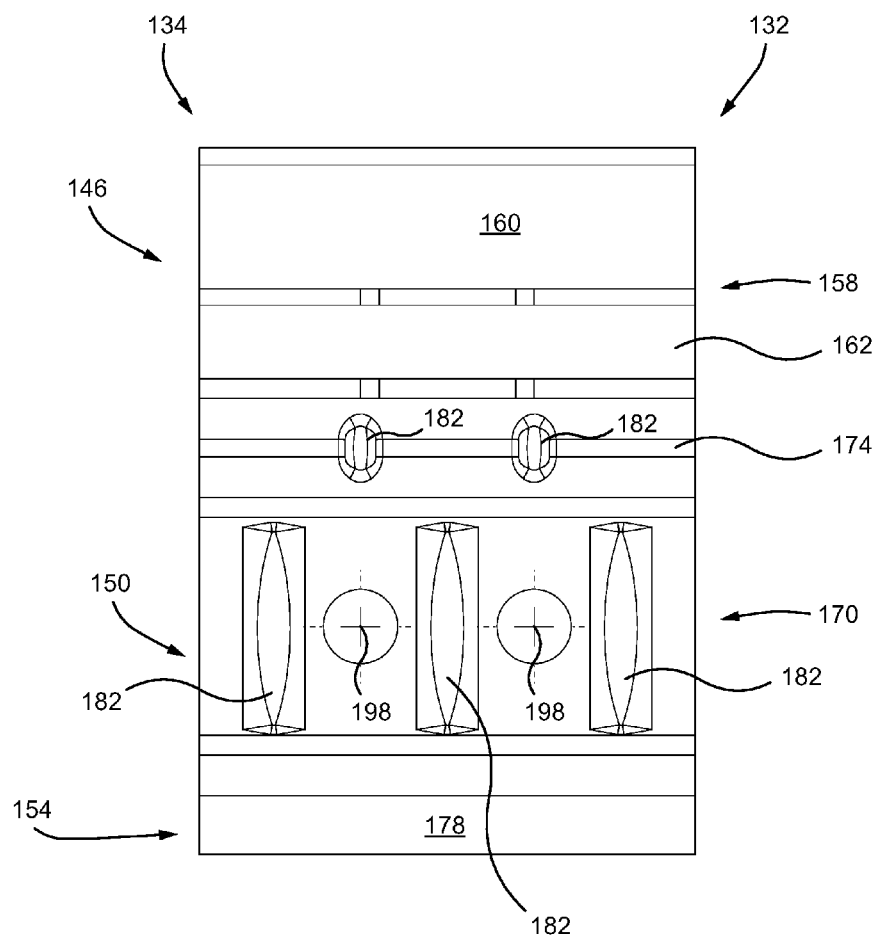
FIG. 12 is a front elevation view of a securing clamp in accordance with embodiments thereof.

Each clamp 134 is, in the present embodiment, made of bent sheet metal that is forming a gripping portion 146, a securing portion 150 and an abutting portion 154. The gripping portion 146 includes a beam-engaging portion 158 including an inclined member 160 that is preferably positioned at an angle α, that is illustratively about between 30 degrees and 40 degrees, and more preferably about 34 degrees in the illustrated embodiment, to collect therein sections of I-beams 142 having different dimensions and thicknesses. The gripping portion 146 merges into a first contacting portion 162, configured to laterally abut sides of an I-beam 142, that merges into a second contacting portion 166 configured to vertically contact a surface of the I-beam 142. A securing portion 170 is formed between a first protruding member 174 and a second protruding member 178. Both protruding members 174, 178 are proximally extending about a similar distance to allow leveled abutment of the two clamps 134 when secured and pulled toward each other. The second protruding member 178 is also helpful to prevent premature rotation of the assembly when tightening the fasteners 138 by its lever action and touching each other along a line to provide resistance to rotation to the assembly. Additional bents 182 are performed on the clamp 134 to increase mechanical strength thereof. An elastic member 186, embodied as an elastic band in the present embodiment, is used to keep both clamps 134 together in clamping position for facilitating the positioning of the clamps 134 prior to secure the clamps 134 to the I-beam 142. Helical springs 188 can optionally be used to pretense the assembly as illustrated in FIG. 9. The pre-assembly of the two clamps 134 are allowing suspending the two clamps 134 to the I-beam 142 to connect the parts of the aerodynamic skirt assembly 30 in place before adjusting the layout and securing them in a final operating configuration. Distance 190.1 is preferably configured to be close to zero (0) when the two clamps 134 are secured toward each other and a distance 194 is preferably configured to be a little wider than distance 190 from first and second protruding portions 174, 178 to accommodate a central member of the I-beam 142 between the two clamps 134 when the clamps 134 are secured to an I-beam 142. Distance 190 is likely going to be smaller when the clamps 134 are secured to a narrow I-beam 142. Conversely, distance 190.1 is going to increase when the clamps 134 are secured to a wider I-beam and distance 190.2 is going to diminish accordingly. Holes 198 are made in the securing portion 170 to accommodate fasteners 138 therein to secure both clamps 134 together. The interaction of the securing member 42 with an I-beam 142 is depicted in FIG. 14 throughout FIG. 20.

Figure 17:
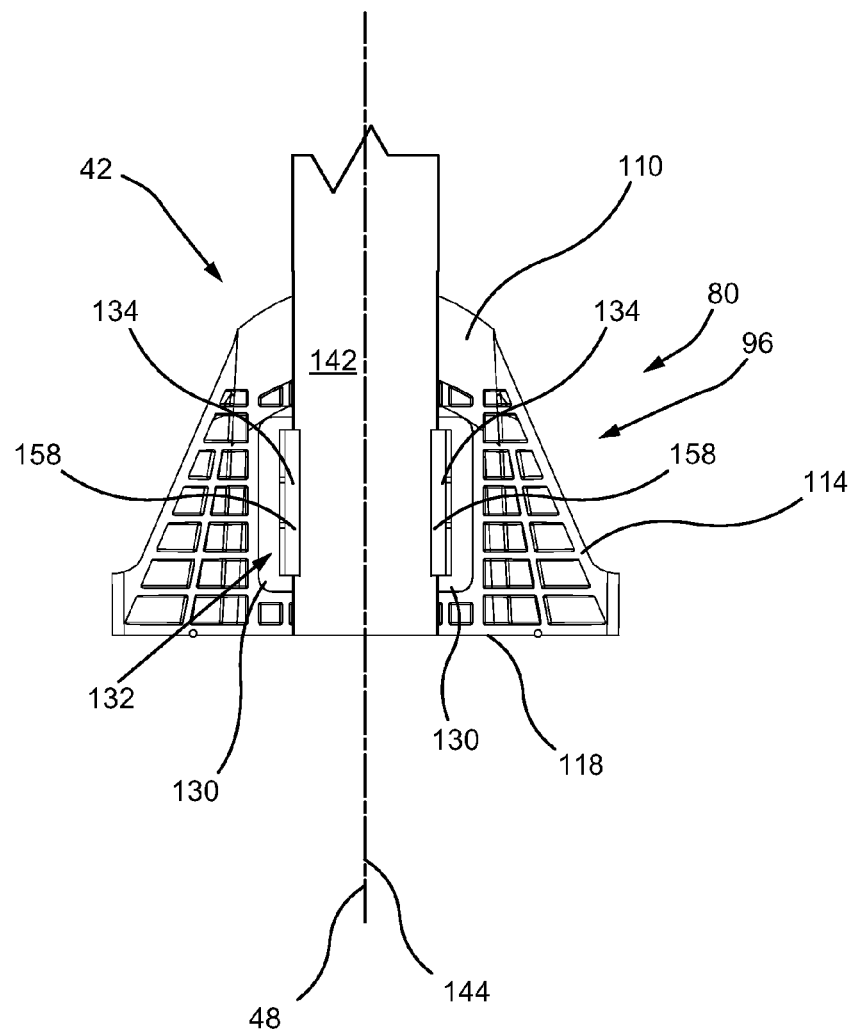
FIG. 17 is a top plan view of a securing mechanism and a securing member in accordance with embodiments thereof.
Figure 18:
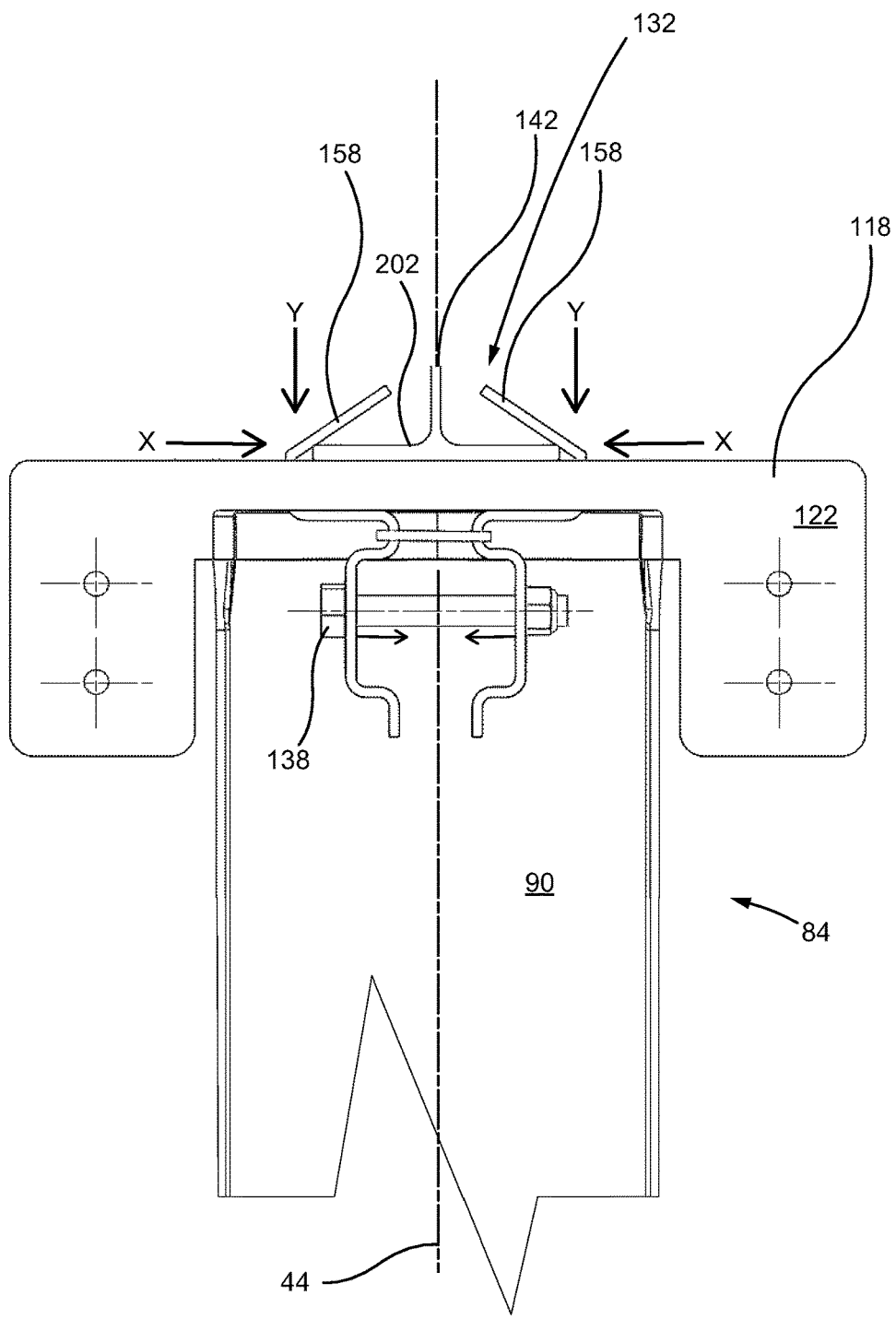
FIG. 18 is a partial left elevation view of a securing mechanism and a securing member in accordance with embodiments thereof.
Figure 19:
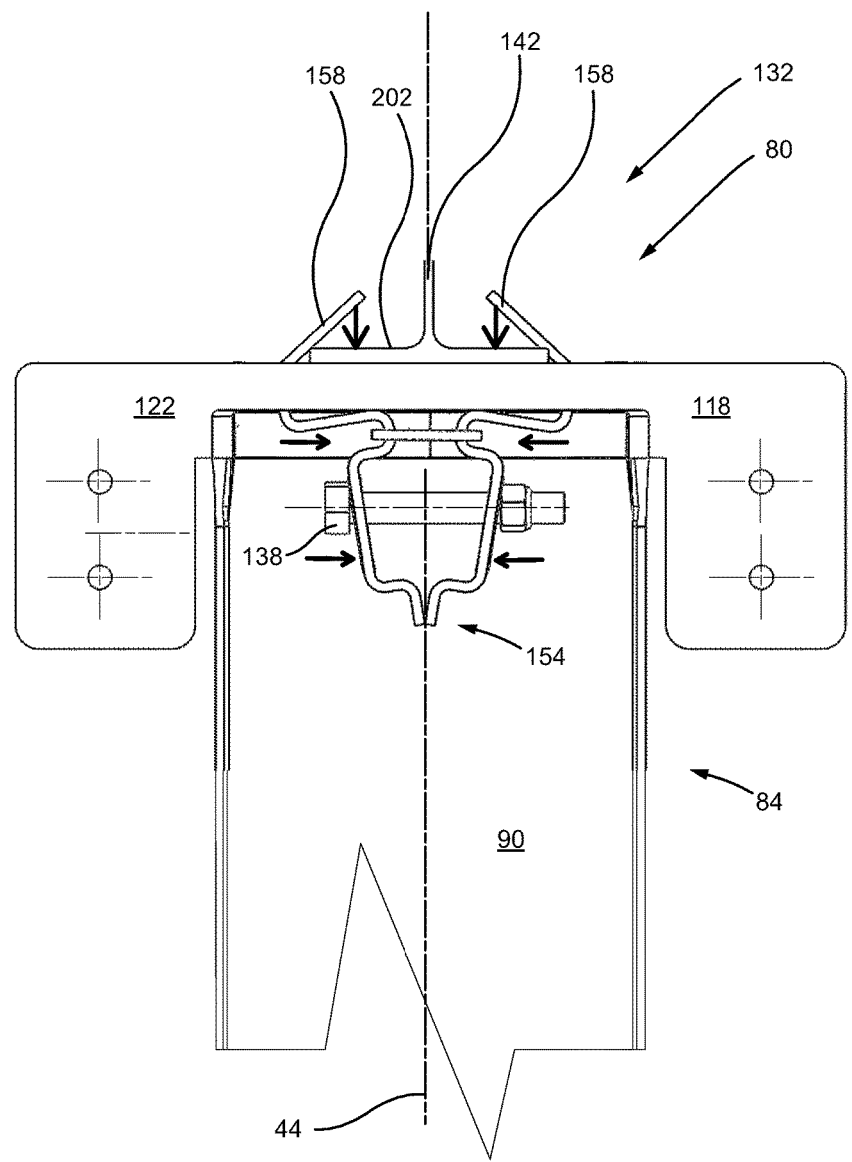
FIG. 19 is a partial left elevation view of a securing mechanism and a securing member in accordance with embodiments thereof.

It can be appreciated from FIG. 14 throughout FIG. 17 the gripping portion 146, with the inclined member 160, is compressing together vertically and laterally the trailer-contacting portion 114 with a lower portion 202 of the I-beam 142. The illustrated structure also has the capacity to adapt to a variety of I-beams 142 sizes. The lower portion 202 (bottom flange) can be wider 206 and/or thicker 210 and still be captured and secured with the connector portion 80 of the securing member 42. Typically, the lower portion 202 of the I-beam 142 is varying from about 41 mm to about 85 mm width, and thickness of about 3 mm to about 13 mm. This is illustrated in FIG. 18 and in FIG. 19.

Figure 21:
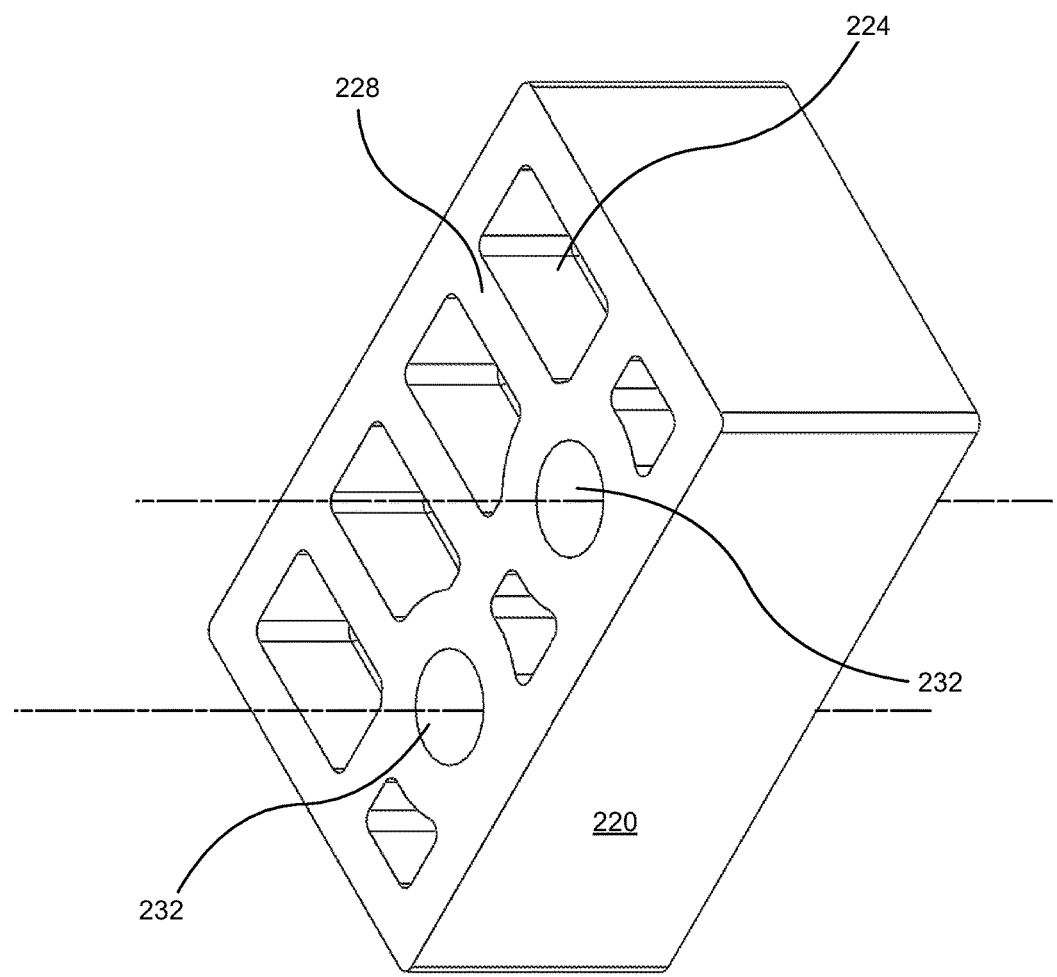
FIG. 21 is a perspective view of a spacer in accordance with embodiments thereof.

One can appreciate the I-beam 142 is parallel with the central axis 144 of the I-beam 142 in FIG. 14 throughout FIG. 17. The connector portion 80 is designed to allow misalignment of the strut portion 84 with the I-beam 142 of the trailer 42 to properly locate the skirt panel 38 in an aerodynamic configuration or to compensate a particular "I-beam" 142 structure. The alignment between the clamps 134 can be made by contacting the abutting portions 154 together. However, in a case of a wider I-beam 142, a spacer 220 can be required to space apart the abutting portions 154. The spacer 220 is sized and designed to distance the pair of clamps 134 from each other to allow the clamps 134 to be in the right orientation for optimal clamping force. In other words, the clamps 134 are optimally positioned when they are substantially parallel to each other. The spacer 220, better seen in FIG. 20 and FIG. 21 can be made of different material having suitable mechanical properties like steel, aluminum or plastic. The spacer 220 includes optional voids 224 and ribs 228 to lighten the spacer 220 and reinforce desirable areas thereof. The spacer further includes fastener-receiving portions 232 configured to receive therein 138.

Figure 22:
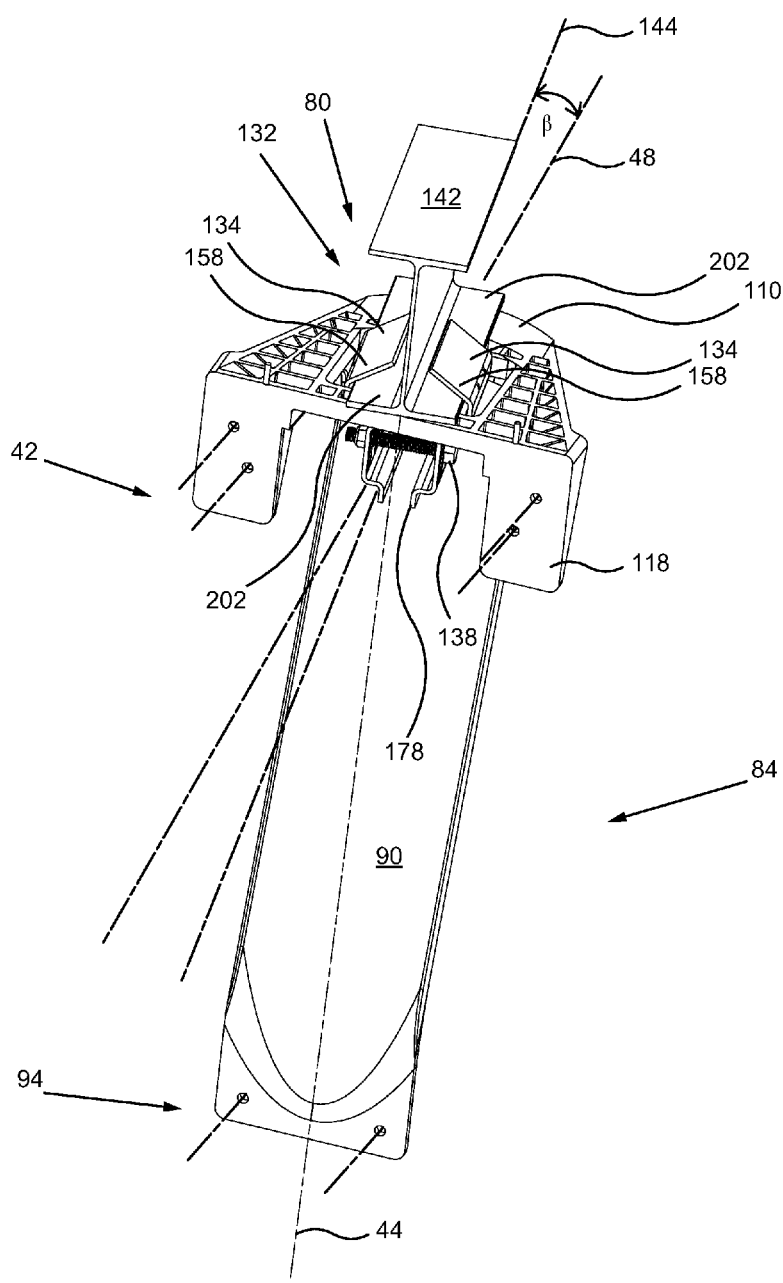
FIG. 22 is a perspective view of a securing mechanism and a securing member in accordance with embodiments thereof.
Figure 23:
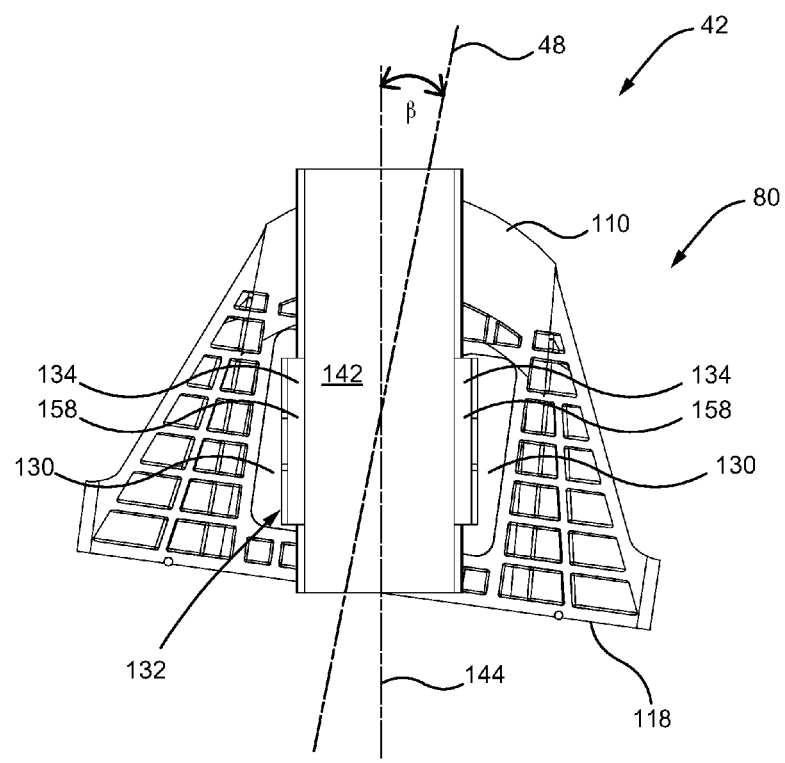
FIG. 23 is a top plan view of a securing mechanism and a securing member in accordance with embodiments thereof.

A misalignment between the strut portion 84 and the I-beam 142 of the trailer 42 can occur if the trailer 20 has I-beams 142 that are not perfectly aligned and, depending of the installation configuration of the skirt panel 38 along the trailer 20, the front portion 58 of the skirt panel 38 can proximally lean toward the center of the trailer 20 hence progressively curving or bending and be located at an angle with the I-beam 142 of the trailer 20 as illustrated in FIG. 22 and FIG. 23. The size of the openings 130 is designed to accommodate the installation of the pair of clamps 134 at an angle β thereof.

Figure 24:
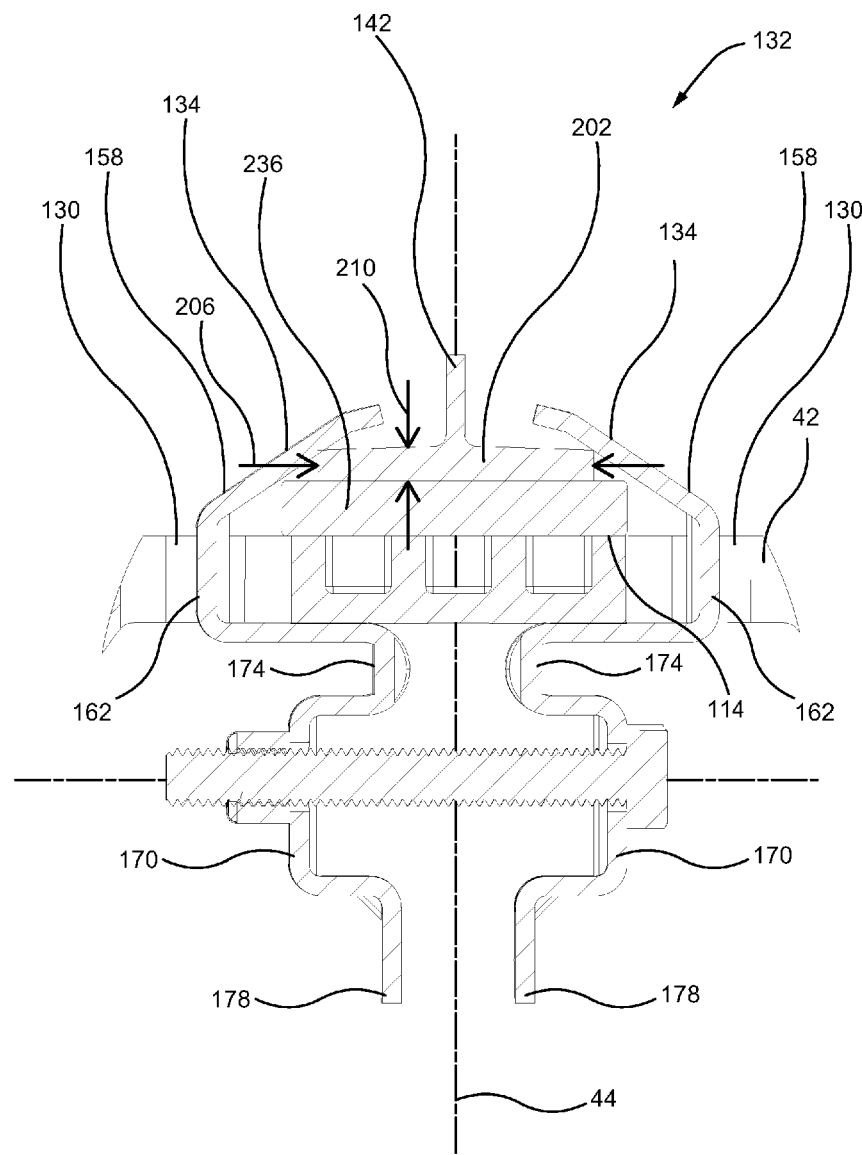
FIG. 24 is a partial transversal section view of a securing mechanism with a beam-spacer and a securing member in accordance with embodiments thereof.

I-beams 142 can have various configurations and thicknesses. In so doing, the securing mechanism 132 can be used in conjunction with an optional beam-spacer 236 as illustrated in FIG. 24. The beam-spacer 236 can come in different shapes, sizes and thicknesses without departing from the scope of the present invention. The beam-spacer 236 is preferably used between the I-beam 142 and the trailer-contacting portion 114 of the securing member 42 to adjust the size of the clamped material for optimizing the position and angle of the pair of opposed clamps 134 when the width 206 and/or the thickness 210 of the lower portion 202 of the I-beam 142 do not optimally fit the size of the securing mechanism 132. For example, a beam-spacer 236 could be required in case where the I-beam 142 thickness 210 is about 4.8 mm or less and the width 206 is about 44 mm or less.

Figure 25:
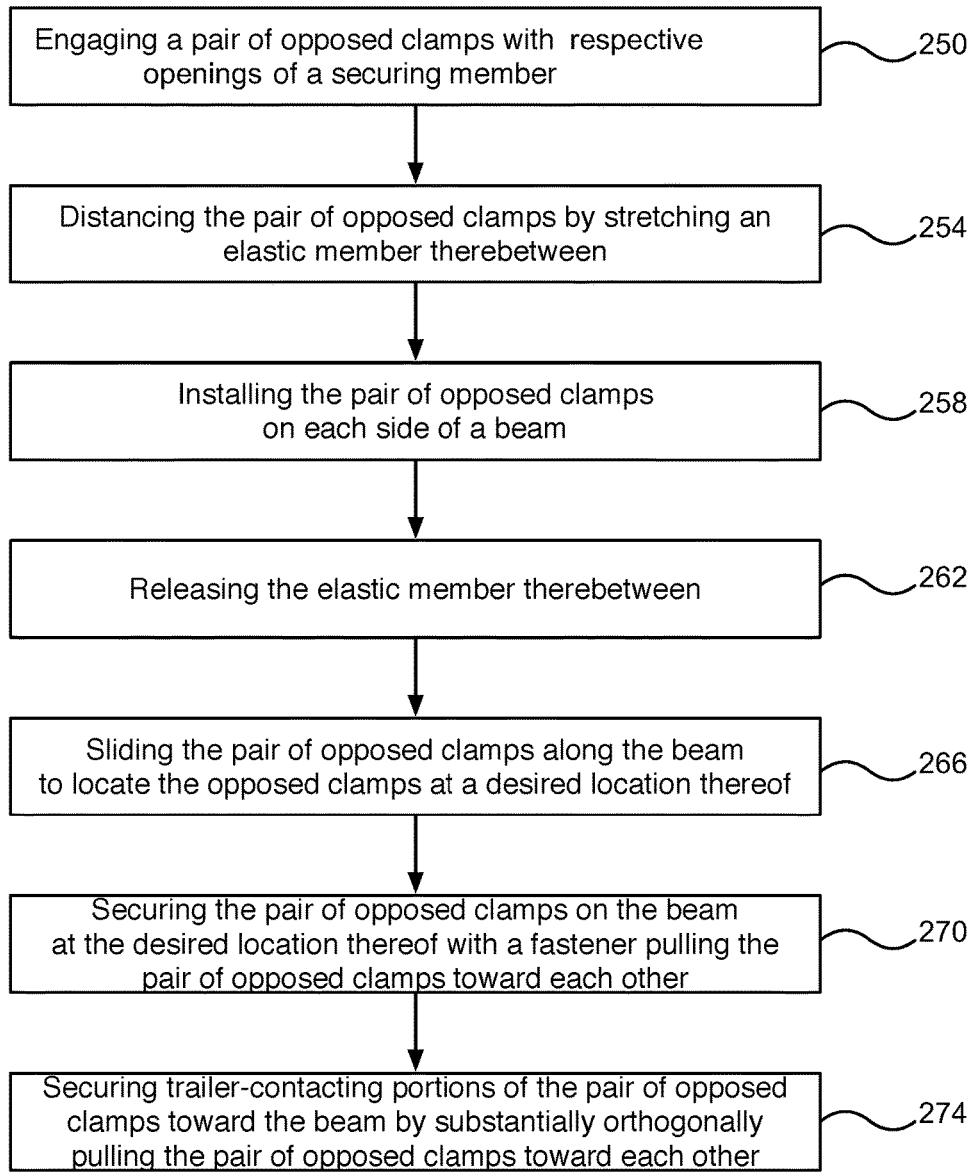
FIG. 25 is an exemplary flow chart illustrating a method of installing the securing member and the securing mechanism to a beam, in accordance with embodiments thereof.

FIG. 25 is an exemplary flow chart illustrating a series of steps for locating and securing a pair of opposed clamps 134 on an I-beam 142. The pair of clamps 134 are engaged with respective openings 130 of a securing member 42, 250. The pair of opposed clamps 134 are distanced from each other 154 by stretching an elastic member 186 to install the pair of opposed clamps on a beam 142, 258. Releasing the elastic member 186 to engage the beam 142 with the opposed clamps 134. Sliding the pair of opposed clamps 134 along the beam 142 to locate the clamps 134 and the securing member 42 at a desired position along the beam 142, 266. Securing the pair of clamps 134 on the beam 142, 270 and securing trailer-contacting portions 114 of the securing member 42 to the beam 142, 274.

While the invention has been described in connection with what is presently considered to be the most practical and preferred embodiments, it is to be understood that the invention is not to be limited to the disclosed embodiments and elements, but, to the contrary, is intended to cover various modifications, combinations of features, equivalent arrangements, and equivalent elements included within the spirit and scope of the appended claims. Furthermore, the dimensions of features of various components that may appear on the drawings are not meant to be limiting, and the size of the components therein can vary from the size that may be portrayed in the figures herein. Thus, it is intended that the present invention covers the modifications and variations of the invention, provided they come within the scope of the appended claims and their equivalents.

What is claimed is:
1. A securing mechanism for securing a skirt securing device to an I-beam of a trailer, the securing mechanism comprising:
a pair of clamps adapted to be latched together to secure a trailer-contacting portion from the skirt securing device to the I-beam of the trailer, wherein the skirt securing device comprises a plurality of openings therein, the pair of clamps including a central axis when the pair of clamps is assembled in a latched configuration thereof; each clamp comprising
a gripping portion for securing a lower portion of the I-beam, the gripping portion including
an inclined portion including an end proximal to the central axis and an end distal to the central axis;
a first contacting portion connected, at a first end thereof, to the distal end of the inclined portion, the first contacting portion being disposed at an angle with the inclined portion and substantially parallel with the central axis; and
a second contacting portion connected, at a distal end thereof, to a second end of the first contacting portion and generally orthogonally disposed in respect with the first contacting portion and the central axis;

each clamp further comprising
a protruding member connected to a proximal end of the second contacting portion;
a securing portion connected, at a first end thereof, to the protruding member; and
an abutting portion connected to a second end of the securing member;

the securing mechanism further comprising
a fastener for moving the clamps toward each other, wherein, upon moving the clamps toward each other, the inclined portion contacting the I-beam is proximally moving the first contacting portion and the second contacting portion in an axial direction toward the I-beam for securing therebetween the trailer-contacting portion of the skirt securing device against the lower portion of the I-beam, wherein the protruding member and the abutting portion are substantially coplanar, wherein one of the clamps is inserted in the one of the plurality openings of the skirt securing device and the other clamp is inserted in another one of the plurality of openings of the skirt securing device.

2. The securing mechanism of claim 1, wherein the securing portion comprises a fastener opening therein.

3. The securing mechanism of claim 2, wherein the fastener is sized and designed for engaging the fastener opening and applying compression on the clamps toward each other, for moving the clamps toward each other.

4. The securing mechanism of claim 1, wherein the abutting portions of the pair of clamps are contacting each other when the fastener is tightened.

5. The securing mechanism of claim 1, wherein the protruding member includes a semi-cylindrical shape.

6. The securing mechanism of claim 1, wherein the pair of clamps include steel.

7. The securing mechanism of claim 1, wherein the securing portion comprises a spring for pushing against the pair of clamps.

8. The securing mechanism of claim 1, wherein the securing portion comprises a bent therein for increasing a mechanical strength thereof.

9. The securing mechanism of claim 1, wherein the securing portion comprises an elastic member for pushing the pair of clamps toward each other during assembly thereof.

10. The securing mechanism of claim 1, wherein the securing portion comprises a spacer for installation between the pair of clamps for distancing the pair of clamps from each other.

11. A securing mechanism kit for securing a skirt securing device to an I-beam of a trailer, the securing mechanism kit comprising:
a pair of clamps adapted to be latched together to secure a trailer-contacting portion from the skirt securing device to the I-beam of the trailer, wherein the skirt securing device comprises a plurality of openings therein, the pair of clamps including a central axis when the pair of clamps is assembled in a latched configuration; each clamp comprising
a gripping portion for securing a lower portion of the I-beam, the gripping portion including
an inclined portion including an end proximal to the central axis and an end distal to the central axis;
a first contacting portion connected, at a first end thereof, to the distal end of the inclined portion, the first contacting portion being disposed at an angle with the inclined portion and substantially parallel with the central axis; and
a second contacting portion connected, at a distal end thereof, to a second end of the first contacting portion and generally orthogonally disposed in respect with the first contacting portion and the central axis;

each clamp further comprising
a protruding member connected to a proximal end of the second contacting portion;
a securing portion connected, at a first end thereof, to the protruding member; and
an abutting portion connected to a second end of the securing member;

the securing mechanism further comprising
a protruding member connected to a proximal end of the second contacting portion;
a fastener moving the clamps toward each other, wherein, upon moving the clamps toward each other, the inclined portion contacting the I-beam is proximally moving the first contacting portion and the second contacting portion in an axial direction toward the I-beam for securing therebetween the trailer-contacting portion of the skirt securing device against the lower portion of the I-beam, wherein the protruding member and the abutting portion are substantially coplanar, wherein one of the clamps is inserted in the one of the plurality openings of the skirt securing device and the other clamp is inserted in another one of the plurality of openings of the skirt securing device.

12. The securing mechanism kit of claim 11, wherein the securing portion comprises a fastener opening therein.

13. The securing mechanism kit of claim 12, wherein the fastener is sized and designed for engaging the fastener opening therein and applying compression the clamps toward each other for moving the clamps toward each other.

14. The securing mechanism kit of claim 11, wherein the abutting portions of the pair of clamps are contacting each other when the fastener is tightened.

15. The securing mechanism kit of claim 11, wherein the protruding member includes a semi-cylindrical shape.

16. The securing mechanism kit of claim 11, wherein the pair of clamps include steel.

17. The securing mechanism kit of claim 11, wherein the securing portion comprises a spring for pushing against the pair of clamps.

18. The securing mechanism kit of claim 11, wherein the securing portion comprises a bent therein for increasing a mechanical strength thereof.

19. The securing mechanism kit of claim 11, wherein the securing portion comprises an elastic member for pushing the pair of clamps toward each other during assembly thereof.

20. The securing mechanism kit of claim 11, wherein the securing portion comprises a spacer for installation between the pair of clamps for distancing the pair of clamps from each other.

* * * * *